United States Patent
Steward et al.

(10) Patent No.: US 12,281,917 B2
(45) Date of Patent: Apr. 22, 2025

(54) SYSTEM REPRESENTATION AND METHOD OF USE

(71) Applicant: Tangram Robotics, Inc., Burlingame, CA (US)

(72) Inventors: Jeremy Steward, Burlingame, CA (US); Brandon Minor, Burlingame, CA (US)

(73) Assignee: Tangram Robotics, Inc., Burlingame, CA (US)

( * ) Notice: Subject to any disclaimer, the term of this patent is extended or adjusted under 35 U.S.C. 154(b) by 0 days.

(21) Appl. No.: 17/885,135

(22) Filed: Aug. 10, 2022

(65) Prior Publication Data

US 2023/0050389 A1 Feb. 16, 2023

Related U.S. Application Data

(60) Provisional application No. 63/231,605, filed on Aug. 10, 2021.

(51) Int. Cl.
*G01D 18/00* (2006.01)
*G06V 10/80* (2022.01)

(52) U.S. Cl.
CPC .......... *G01D 18/00* (2013.01); *G06V 10/803* (2022.01)

(58) Field of Classification Search
CPC ...... G06V 10/803; G01D 18/00; G01D 21/00; G01D 18/008; G01D 1/00; G01D 15/00
USPC ....................................................... 702/104
See application file for complete search history.

(56) References Cited

U.S. PATENT DOCUMENTS

| | | | |
|---|---|---|---|
| 2006/0027404 A1 | 2/2006 | Foxlin | |
| 2007/0209075 A1* | 9/2007 | Coffman | H04L 63/14 709/224 |
| 2016/0342146 A1 | 11/2016 | Rencs | |
| 2018/0074209 A1* | 3/2018 | Madhow | G01S 19/11 |
| 2019/0041840 A1 | 2/2019 | Cella et al. | |
| 2020/0226789 A1* | 7/2020 | Ma | G06T 7/70 |
| 2020/0378808 A1* | 12/2020 | Platonov | G01B 11/24 |

(Continued)

FOREIGN PATENT DOCUMENTS

| | | |
|---|---|---|
| CA | 2364535 A1 | 6/2002 |
| EP | 3745082 A1 | 12/2020 |
| WO | 2018051274 A1 | 3/2018 |

OTHER PUBLICATIONS

Barcelo-Ordinas, Jose, et al., "Self-Calibration Methods for Uncontrolled Environments in Sensor Networks: A Reference Survey", Ad Hoc Networks, Elsevier, 2019, 88, pp. 142-159. 10.1016/j.adhoc. 2019.01.008 . hal-02162764.

(Continued)

*Primary Examiner* — Michael P Nghiem
(74) *Attorney, Agent, or Firm* — Jeffrey Schox; Diana Lin

(57) ABSTRACT

In variants, a system management platform can include a set of system representations and a set of platform-standard element models. Each system representation can include a set of component representations related by a set of constraint representations 140, which can represent the sensing components of a system and the relationships therebetween, respectively, and store component-specific and constraint-specific calibration parameter values, respectively. The component representations 120 can optionally reference the element models.

16 Claims, 21 Drawing Sheets

(56) References Cited

U.S. PATENT DOCUMENTS

2023/0256610 A1   8/2023   Steward et al.

OTHER PUBLICATIONS

Chen, Hongyu, et al., "Heterogeneous Multi-sensor Calibration based on Graph Optimization", IEEE International Conference on Real-time Computing and Robotics(RCAR) 2019: IEEE Press, 2019.
Owens, Jason L., et al., "MSG-Cal: Multi-sensor Graph-based Calibration", Sep. 28, 2015-Oct. 2, 2015 IEEE/RSJ International Conference on Intelligent Robots and Systems (IROS).
Reinke, Andrzej, et al., "A Factor Graph Approach to Multi-Camera Extrinsic Calibration on Legged Robots", arXiv:1811.01254v3 Jan. 14, 2019.

* cited by examiner observation element type: element type i component UUID: UUID j observation value

FIGURE 6

```
100 ─┐   {
         "uuid": system_ID,
         "creation_timestamp": time_creation,
         "components": [
             // array of components
         ],
         "spatial_constraints": [
             // array of spatial constraints
         ],
         "temporal_constraints": [
             // array of temporal constraints
         ]
     }
```

FIGURE 11A

```
120 ─┐   "component_type": {
             "uuid": component_ID,
             "Name" : semantic_name,
             "Intrinsics" : {
                 // intrinsic models & variable values for each intrinsic parameter
                 "intrinsic_submodel" : {
                     "model_variant_name" : {
                         "variable_name" : variable_value,
                         . . .
                     }
                 },
                 "intrinsic_submodel" : {
                     . . .
                 },
                 . . .
             },
             "covariance" : [
                 [covariance_matrix_for_intrinsic_parameter_variables],
                 . . .
             ],
             "component_configurable_variable": configurable_variable_value
         }
```

FIGURE 11B

```
140 ─┐
"spatial_constraint" : {
    "extrinsics" : {
        "rotation" : [...],
        "translation" : [...],
    },
    "covariance" : {
        [extrinsic_covariance_matrix],
    },
    "from" : component_identifier,
    "to" : component_identifier,
}
```

```
140 ─┐
"temporal_constraint" : {
    "synchronization" : {
        "offset" : offset_value,
        "skew" : skew_value
    },
    "resolution" : resolution_value,
    "from" : component_identifier,
    "to" : component_identifier,
}
```

FIGURE 11C                              FIGURE 11D

```
{
    "uuid": system_ID,
    "creation_timestamp": time_creation,
    "components": [
        // array of components
        "component_type": {
            "uuid": component_ID,
            "Name" : semantic_name,
            "Intrinsics" : {
                // intrinsic models & variable values for each intrinsic parameter
                "intrinsic_submodel" : {
                    "model_variant_name" : {
                        "variable_name" : variable_value,
                        . . .
                    }
                },
                "intrinsic_submodel" : {
                    . . .
                },
                . . .
            },
            "covariance" : [
                [covariance_matrix_for_intrinsic_parameter_variables],
                . . .
            ],
            "component_configurable_variable": configurable_variable_value
        }
        . . .
    ],
    "spatial_constraints": [
        // array of spatial constraints
        "spatial_constraint" : {
            "extrinsics" : {
                "rotation" : [...],
                "translation" : [...],
            },
            "covariance" : {
                "extrinsic_type": [extrinsic_covariance_matrix],
                . . .
            },
            "from" : component_identifier,
            "to" : component_identifier,
        },
        . . .
    ],
    "temporal_constraints": [
        // array of temporal constraints
        "temporal_constraint" : {
            "synchronization" : {
                "offset" : offset_value,
                "skew" : skew_value
            },
            "resolution" : resolution_value,
            "from" : component_identifier,
            "to" : component_identifier,
        },
        . . .
    ]
}
```

```
{
  "camera": {
    "uuid": "5680872f-3e03-4f78-85d1-7fda3630f590",
    "root_uuid": "87138608-cf78-446c-afdc-d5ec13aed385",
    "name": "Infrared camera #3 - Front side",
    "intrinsics": {
      "projection": {
        "pinhole": {
          "f": 382.8955878125,
          "cx": 324.38397216796875,
          "cy": 243.57395935058594
        }
      },
      "distortion": {
        "brown_conrady": {
          "k1": 0,
          "k2": 0,
          "k3": 0,
          "p1": 0,
          "p2": 0
        }
      },
      "affinity": {
        "a1": 0
      },
      "width": 640,
      "height": 480
    },
    "covariance": [
      [
        1000, 0, 0, 0, 0, 0, 0, 0, 0,
        0, 1000, 0, 0, 0, 0, 0, 0, 0,
        0, 0, 1000, 0, 0, 0, 0, 0, 0,
        0, 0, 0, 1000, 0, 0, 0, 0, 0,
        0, 0, 0, 0, 1000, 0, 0, 0, 0,
        0, 0, 0, 0, 0, 1000, 0, 0, 0,
        0, 0, 0, 0, 0, 0, 1000, 0, 0,
        0, 0, 0, 0, 0, 0, 0, 1000, 0,
        0, 0, 0, 0, 0, 0, 0, 0, 1000
      ],
      9,
      9
    ],
    "pixel_pitch": 1
  }
}
```

FIGURE 11F

SYSTEM REPRESENTATION AND METHOD OF USE

CROSS-REFERENCE TO RELATED APPLICATIONS

This application claims the benefit of U.S. Provisional Application No. 63/231,605, filed 10 Aug. 2021, which is incorporated in its entirety by this reference.

TECHNICAL FIELD

This invention relates generally to the sensor field, and more specifically to a new and useful system representation 100 and method of use in the sensor field.

BRIEF DESCRIPTION OF THE FIGURES

FIG. 6 is a schematic representation of an example of an observation.

FIG. 11A is an illustrative example of a system representation.

FIG. 11B is an illustrative example of a component representation.

FIG. 11C is an illustrative example of a spatial constraint representation.

FIG. 11D is an illustrative example of a temporal component representation 120.

FIG. 11E is an illustrative example of a system representation.

FIG. 11F is an illustrative example of a camera component representation 120.

DETAILED DESCRIPTION

The following description of the embodiments of the invention is not intended to limit the invention to these embodiments, but rather to enable any person skilled in the art to make and use this invention.

1. Overview

Figure 1:
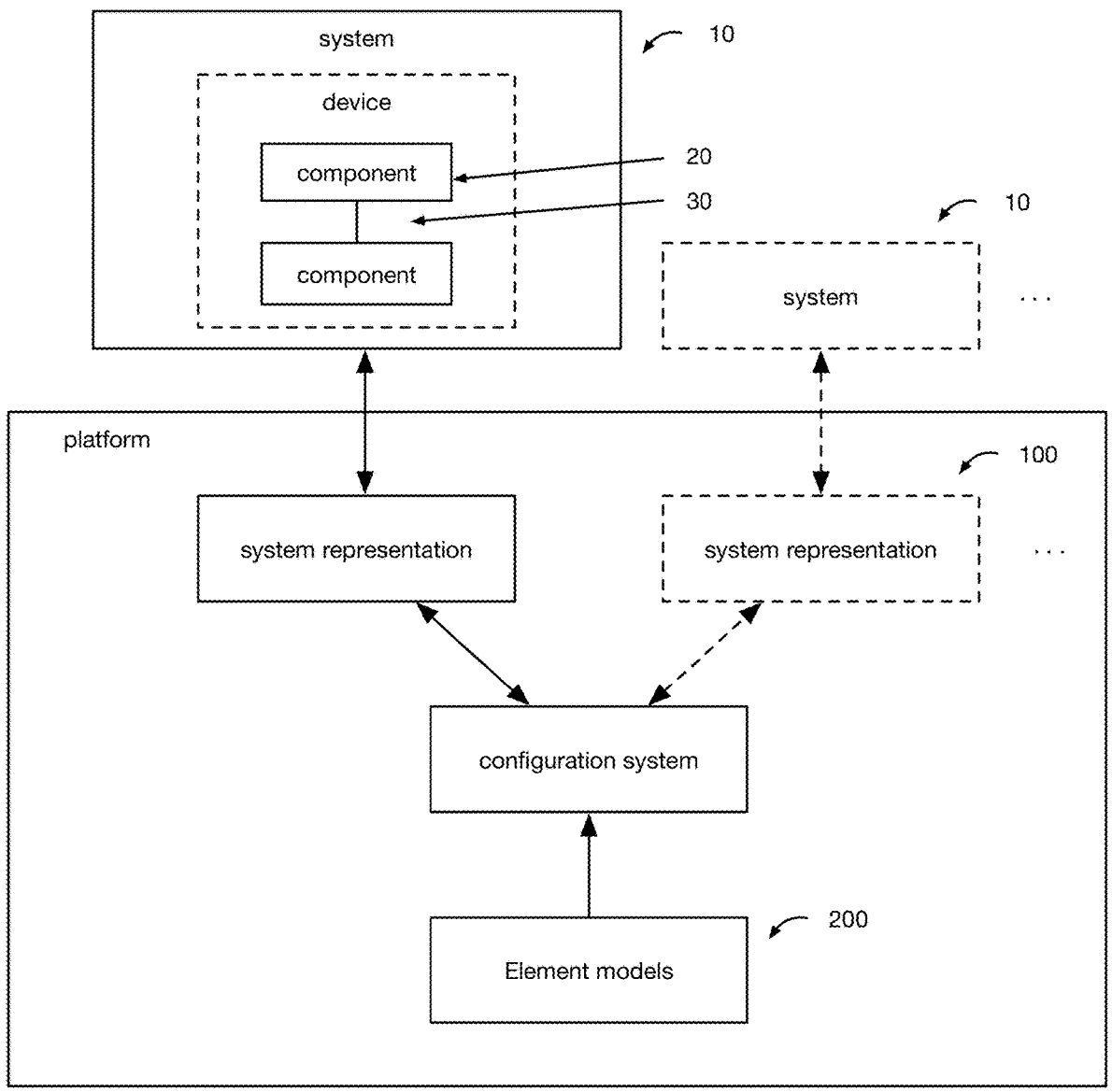
FIG. 1 is a schematic representation of a variant of the platform.

As shown in FIG. 1, variants of the platform can include: a set of system representations 100 (e.g., "Plexes") and a set of element models 200. Each system representation 100 can include a set of component representations 120 related by a set of constraint representations 140, which can represent the sensing components 20 of a system 10 and the relationships 30 therebetween, respectively.

The platform can be used to: calibrate one or more systems, interpret observations generated by the systems, fuse observations from different sensing components of the system, and/or perform any other suitable functionality.

In an example, the platform includes a system representation 100 for each of a set of systems, wherein each system includes a set of devices (e.g., packaged sensor modules), wherein each device includes a set of sensors ("components") that each generate an observation stream. Each system representation 100 can include a component representation 120 for each component and a set of constraint representations relating the components. Each component representation 120 can store: a set of model identifiers (e.g., intrinsic model identifiers, transformation model identifiers, etc.) associated with the respective component; parameter values for the identified models; covariance or uncertainty values (e.g., for each parameter); component parameter values; and/or other component data. Each constraint representation can represent a spatial relationship (e.g., include extrinsic parameters), temporal relationship (e.g., include synchronization parameters), semantic relationship, and/or other relationship between the represented components. In a specific example, the system representation 100 can be represented (e.g., virtually or conceptually) as a fully or partially connected, undirected, incomplete graph, wherein each component representation 120 is treated as a node that represents a component, and each constraint representation 140 is treated as an edge that represents the relationship between two components.

In examples, the system representation 100 can be used to calibrate the system. This can include: determining the observation streams output by each component; compiling a calibration equation set based on the system representation; and calibrating the system using the observation streams and the calibration equation set (e.g., examples shown in FIG. 3 and FIG. 4). Compiling the calibration equation set can include, for each component representation 120: determining a set of standard model variants identified by the component representation 120, determining constraint models associated with the constraint between the component representations 120, optionally determining object space extrinsics (e.g., relating observations to a global object space), and compiling the equations from the identified set of standard model variants, the constraint models (e.g., modeling relative constraints, such as spatial constraints, temporal constraints, etc.), and/or the object space models into the calibration equation set. The calibration equation set can optionally be populated with the a priori variable values (e.g., intrinsic values, constraint values, object space values, etc.) and uncertainty values specified by the component representation 120. Calibrated parameter values (and optionally uncertainties) for each component are then determined by optimizing the calibration equation set using the observation values from each observation stream. The spatial relationships between the components can optionally be represented as virtual observations (e.g., extrinsic relationships) in the optimization. The calibrated parameter values (and optionally uncertainties) can then be stored in the component representation 120 (e.g., node) within the system representation 100 (e.g., the a priori values are updated to posterior values), and used to correct observation values during runtime.

In examples, the system representation 100 can be used to interpret the observation streams generated by the components of the system. For example, interpreting an observation stream can include: determining a component representation 120 associated with (e.g., identified by) the observation stream; determining a set of standard model variants identified by the component representation 120, wherein the standard model variants are associated with the observation stream (e.g., via the component, the element type, observation type, component type, etc.); determining the parameter values (e.g., variable values) for the standard model variant's equations from the component representation 120; and interpreting the observation stream based on the standard model variant and the parameter values. In a specific example, the intrinsic parameter values stored by each component representation 120 can be used to interpret the observations from the respective component.

Additionally or alternatively, observations generated by two or more components can be fused using the respective component representations 120 and the constraints defining a path connecting the component representations 120.

However, the system representation 100 can be otherwise configured, and the system can be otherwise calibrated.

2. Technical Advantages

Variants of the platform and method can confer several advantages over conventional systems.

First, the system representation 100 ("Plex") can represent the calibration and relationships between all components of a system in a single, unified, and complete representation (e.g., data structure). In variants, a complete representation of a system can be fully modeled (e.g., including a physical model and the intrinsic value for each component), fully registered (e.g., the spatial relationships between all components can be directly or indirectly determined), and fully synchronized (e.g., the temporal relationships between all components can be directly or indirectly determined), but can be otherwise defined. In variants, this representation can be atomically updated (e.g., all calibrations and relationships are updated together, at the same time). This representation can eliminate the prior problems arising from maintaining per-sensor calibrations, such as ambiguities around which calibration is up-to-date or accurate.

Second, the system representation 100 enables more structured analysis of the observations or measurements output by the components. This can be achieved by including the uncertainties (e.g., variances, covariances, etc.) for each parameter in the system representation 100 provided to the downstream processing system, and by accounting for the uncertainties (e.g., variances, covariances, etc.) for each parameter and observation within the calibration process.

Third, variants of the system representation 100 can use the observation type as the base modeled element, such that the models are determined per observation type instead of per component. This can result in a more generalizable, more extensible, more flexible, and more manageable platform. This makes adding a new sensor having a supported observation type almost trivial—instead of creating a new geometric model for each camera make and model, a single model (or model set) can be used for all sensor makes and models that output the observation type (e.g., images, point representations of the scene, etc.). Furthermore, components that can generate multiple observation types (e.g., a depth camera, which can generate both point clouds and images) can simply be associated with two different observation types, instead of requiring a special set of models for the multi-type component. This can reduce the amount of modeling and maintenance required to support a plurality of components. In other variants, the system representation 100 can use the component type as the base modeled element, such that the models are determined per element type (e.g., camera, LIDAR, accelerometer, etc.). These variants can be particularly intuitive to use (e.g., especially when the component outputs a single observation type) because the component identifier semantically describes the component's class and is not limited to a sensor's make and model.

Fourth, the platform can provide different options (e.g., model variants, intrinsic model variants, etc.) for different intrinsics, intrinsic submodels, or transformations within each model, which can enable the standard model to be tailored for a specific component. This allows the platform to be more extensible to additional observational models, since additional transformation types (e.g., intrinsic models, physics models, etc.) can simply be added to the model framework to extend the number of physical models that are supported for the observation type.

Fifth, the platform can reduce the risk of over-generalization while retaining the ability to specialize across different components of the system (e.g., without loss of specificity). For example, instead of having a special input for each component and observation, the platform can receive a generic input (e.g., an observation having a specified observation type and identifying a component), wherein the details of the model associated with the observation type can be tailored based on unique data associated with the identified component (e.g., stored by the component's component representation 120 and constraints). In another example, the platform can receive a generic measurement identifying the source component, wherein the source component's component representation 120 specifies the models and the parameter values to use for measurement interpretation. This also allows the components to be calibrated on-the-fly, and allows the physical modeling for a component to be dynamically adjusted without requiring local system shutdown for calibration.

Sixth, the system can enable components with different parameter sets to be calibrated in the same optimization, since the same base model is used for all instances of the same observation type. For example, two cameras, one with Kannala-Brandt distortions and the other with Brown-Conrady distortions, can be calibrated in the same optimization.

However, further advantages can be provided by the system and method disclosed herein.

3. Platform

In variants, the platform can include a set of system representations 100 and a set of element models 200. Each system representation 100 can include a set of component representations 120 related by a set of constraint representations 140, which can represent the sensing components of a system and the relationships therebetween, respectively.

3.1 Systems

The platform can be used with one or more systems 10 (e.g., analog system, system analog, represented systems, local systems, edge systems, etc.). A system can be a machine, device, structure, and/or be any other suitable system. The system preferably includes one or more sensing units, but can alternatively lack sensing units. Examples of systems can include: vehicles (e.g., aerial vehicles, terrestrial vehicles, etc.), robots, monitoring systems (e.g., water treatment system, security system, powerplant monitoring system, etc.), a sensor stack, and/or any system that has a set of sensors.

The platform can include a system representation 100 (e.g., a Plex) for each system 10, wherein the respective system representation 100 can be used to: calibrate the system, to transform raw measurements into calibrated measurements (e.g., wherein the calibrated measurements can be used for analysis, control, etc.), and/or otherwise used.

Each system can include one or more devices. A device can include one or more components 20 (e.g., sensors; sensing units; analog component; represented component; etc.), and can optionally include a housing enclosing or mounting said components. A device can be a sensor package (e.g., including one or more sensing units), a set of sensor packages, and/or be otherwise constructed.

A component 20 is preferably a single sensor or an indivisible sensing unit (e.g., that would lose a sensing capability if subdivided further), but can be otherwise defined. Each component can be associated with an element type (e.g., component class, component type, etc.), wherein each element type can be associated with the one or more observation types that the component can output (e.g., wherein the element type is a component observation type), a sensing modality, and/or otherwise defined.

Examples of components 20 include: sensors, clocks (e.g., processor clock, GPS clock), and/or other components (e.g., processors). Examples of sensors include: optical sensors (e.g., light sensors, color cameras, IR cameras, multispectral cameras, hyperspectral cameras, depth cameras, thermal cameras, other cameras, etc.), mapping sensors (e.g., LiDAR, stereo cameras, time-of-flight sensors, etc.), position sensors (e.g., encoders, odometers, GNSS systems, etc.), kinematic sensors (e.g., accelerometers, gyroscopes, altimeters, etc.), electromagnetic sensors (e.g., radar, magnetometers, voltage sensors, current sensors, etc.), vibration sensors (e.g., microphones), chemical sensors, environment sensors (e.g., temperature sensors, pressure sensors, force sensors, proximity sensors, etc.), radiation sensors, weight sensors, force sensors, flow sensors, location sensors (e.g., GNSS systems, etc.), and/or other sensors.

Components 20 can be real, virtual, or be any other component. Real components can be physical components, tangible components, or other components. Virtual components can be synthetic components, simulated components, or other components. Examples of virtual components can include: a depth camera (e.g., wherein the stereo camera observations are generated from the image streams of two real cameras, a stereo camera, etc.), a gyroscope (e.g., formed from multiple IMUs), a global clock (e.g., for time synchronization across devices or across systems, wherein each system may or may not include a global clock), or other virtual components. The spatial relationship between the components of a device is preferably known (e.g., predetermined, calculable, etc.), optionally with an associated uncertainty, but can alternatively be unknown.

In an illustrative example, an Intel Realsense D435 can be a device that includes 3 physical components and 1 virtual component: 2 physical infrared cameras, a physical color camera, a virtual stereo camera (e.g., cooperatively formed from measurements of two or more of the physical cameras).

Each component can generate (e.g., output) one or more observation streams 22. Additionally or alternatively, each component can generate zero observation streams. Each observation stream can include a time-series of observations, or be otherwise defined. Each observation can be: a measurement (e.g., a measurement frame), a subunit of a measurement (e.g., a point, a pixel, etc.), a set of features extracted from the measurement (e.g., points, planes, edges, pixel blobs, etc.), and/or be any other suitable observation of a scene. Each observation can be associated with: a component identifier, a timestamp, one or more element types (e.g., observation types), and/or any other suitable observation information (e.g., metadata); example shown in FIG. 6. The observation metadata can be determined by the component generating the observation, by the processing system receiving the observation, and/or otherwise determined. The observation generated by the component is preferably raw and uncalibrated, but can alternatively be calibrated (e.g., wherein the component can apply the calibration transformations specified by the system representation 100 to the observation).

The observation value is preferably determined from the measurement sampled by the corresponding physical or virtual device, but can be otherwise determined. The observation value can optionally be associated with an uncertainty (e.g., known, estimated, or unknown), which can be part of the observation, be modeled for each observation stream instance, or otherwise accounted for.

The devices (and associated components) within the system 10 are preferably related by one or more relationships 30 (e.g., constraints, represented constraint, constraint analog, etc.). A relationship 30 is preferably defined between two devices, more preferably between two components, but can alternatively be defined between more than two devices or components. Example relationships can include: spatial constraints (e.g., how the devices are physically positioned and/or oriented relative to each other); temporal constraints (e.g., how the devices are synchronized relative to each other); semantic relationships (e.g., how the devices are conceptually related to each other); and/or other relationships or constraints. The relationships 30 are preferably defined when assembling the system, but can alternatively be defined by a user or be otherwise defined. The relationships (e.g., existence thereof, values thereof, etc.) can be known or unknown.

However, a system can include any other suitable element, and be otherwise defined.

3.2 Models

The platform can include a set of models. The set of models is preferably shared between all system representations 100 (e.g., define a standard set of models), but can alternatively be specific to a system representation 100 or subset thereof. The set of models can be manually defined, automatically defined, or otherwise defined.

The models are preferably physical models (e.g., modeling the physics of a component or the physics of inter-component relationships), but can additionally or alternatively be any other model. Each model can define a set of variables, a set of equations, and/or any other suitable information.

The set of models are preferably referenceable by the component representations 120, constraint representations 140, and/or any other suitable element of the system representation 100. The referenced models can be used for: calibrating a component, interpreting the observation from a component, converting observations between reference frames, and/or otherwise used.

The models, model subsets, and/or submodels therein can each be uniquely identified by a model identifier (e.g., function name, class name, model name, etc.), or be otherwise identified.

The set of models can include: constraint models, element models, and/or other models.

Constraint models function to model the relationships 30 (e.g., constraints) between components. The constraint models are preferably standard across the platform, but can alternatively be nonstandard and specific to a system representation 100 or a constraint. The constraint models are preferably associated with (e.g., identified by) the constraint representations 140, but can be otherwise used.

The constraint models can include: a spatial constraint model associated with spatial constraints, a temporal constraint model associated with temporal constraints, and/or any other suitable set of models, associated with any other suitable set of constraints.

The spatial constraint model (e.g., "relative extrinsics model") models the spatial relationship or extrinsics between a set of components (e.g., between a pair of components). The platform can include a single spatial constraint model or multiple spatial constraint models. The spatial constraint model preferably models extrinsics (e.g., an extrinsic matrix, defining position and/or orientation parameters, etc.), but can alternatively model any other suitable spatial constraint. The spatial constraint model can additionally or alternatively model or define: covariances (e.g., for the extrinsics), a directionality (e.g., a base coordinate frame, a target coordinate frame or origin of the extrinsics matrix, etc.), and/or any other information. The extrinsic representation and/or model can include: an SE3 space representation (e.g., using lie algebra), an se3 space representation, a quaternion representation, a translation representation, include a set of translations and Euler rotations, include a set of translations and quaternions, and/or use any other suitable representation of a relationship (e.g., in Euclidean space). In variants, the type of extrinsic representation (e.g., extrinsic model type) can optionally be specified within the spatial representation, wherein the equations associated with the respective extrinsic representation type can be used within the equation sets (e.g., calibration equation set). In these variants, different types of extrinsic models can be used for different spatial representations within the same system (e.g., within the calibration equation set, etc.); alternatively, the same extrinsic model can be used for all spatial representations within the system. In an example, the spatial constraint model can include: a set of extrinsic equations; a set of extrinsic parameters (e.g., variables), including: x, y, z, r, θ, and φ; a set of covariances for each extrinsic parameter; a base component identifier (e.g., defining the base coordinate frame); a target component identifier (e.g., defining the origin coordinate frame); and/or other information. In another example, the spatial constraint model can include a set of extrinsic equations, a set of extrinsic parameters including a translation vector (e.g., with x, y, z components) and quaternions (e.g., v1, v2, v3, w1, w2, w3); a starting component identifier; a target component identifier; and/or other information.

The temporal constraint model models the temporal relationship between a set of components (e.g., between a pair of components). The platform can include a single temporal constraint model or multiple temporal constraint models. The temporal constraint model preferably models the synchronization between two clocks, but can alternatively model any other suitable temporal constraint. The temporal constraint model can additionally or alternatively model or define: resolution (e.g., the temporal resolution to which the synchronization should be applied), a directionality (e.g., the unsynchronized clock and the reference clock, etc.), and/or any other information. In an example, the temporal constraint model can include: a set of synchronization equations (e.g., $C_{to}=(\text{skew})*C_{from}+\text{offset}$); a set of synchronization parameters (e.g., variables), including: offset and skew; resolution (e.g., a time window; how far away from an observation to search for a synced pair; etc.); a base component identifier (e.g., the unsynchronized component; $C_{from}$); a target component identifier (e.g., defining the component with the reference clock; $C_{to}$); and/or other information.

However, the platform can include any other suitable set of constraint models.

Element models 200 function to model the physics of a specific component, observation, or other modeled element. The platform preferably defines a predetermined set of standard elements (e.g., platform-standard type), each associated with its own set of models (e.g., specific to the element's physics), but a nonstandard element model can alternatively be used. Element models 200 are preferably referenced by the component representations 120, or be otherwise used.

The element models 200 preferably include physics models, but can be any other model. The model is preferably parametric (e.g., $l=g(x)$), but can additionally or alternatively be nonparametric and/or otherwise configured.

Each element model 200 is preferably specific to a type of modeled element, but can alternatively be shared between different modeled elements. Each modeled element can be associated with a single element model, or be associated with multiple element models. The element can be: an observation, a component, and/or any other suitable element. Examples of element types (e.g., node types) can include: feature types, observation types, component types, and/or other element types.

Elements are preferably temporally dimensionless (e.g., not associated with a time dimension), but can alternatively be associated with a time dimension. In an illustrative example, an "image" observation type can represent still frames and the linear progression of a video. Alternatively, an isolated instance (e.g., image) and a time-series of instances (e.g., video) can be interpreted as separate element types.

In a first variation, the element type can be the feature type extracted from raw measurements. Examples of feature types include: 2D points, 2D lines, planes, meshes, time-stamped values, and/or other feature types.

In a second variation, the element type can be a measurement type. Examples of measurement types can include: images, point clouds, electromagnetic signals (e.g., a voltage and/or current time-series), returns, accelerations, GNSS measurements, velocities, counts, frequencies, temperatures, forces, and/or other types of raw measurements sampled by the sensors. In variants, using measurement type as the model association basis can reduce the number of models needed to represent the components, as different sensor components can output the same type of measurements.

Treating measurements as the modeled element can additionally enable: easier component addition to the platform; use of observations as the base data unit by the system (e.g., enabling faster observation processing during runtime), and/or confer other advantages.

In a third variation, the element type can be defined by the number or combination of spatiotemporal dimensions required to define a unit observation. For example, observation types can include: single values, a time-series of values (or timestamped values), 2D points, 2D lines, planes, meshes, and/or other observation types.

In a fourth variation, the element type can be defined by a unit type, which can be the smallest working component of a piece of data. Examples of unit types can include: images, pixels, point observations (e.g., represented as a Cartesian point, modeled spherically, etc.), acceleration measurements, gyroscope measurements, and/or any other suitable observation type.

In a fifth variation, the element type can be defined by the type of storage used (e.g., volatile, nonvolatile, amount of memory available, buffer, queue, etc.) and/or the storage class (e.g., buffer class, buffer format, etc.), which, in turn, can be defined by unique combinations of the unit type (e.g., as discussed above), the data dimensionality (e.g., 1D, 2D, 3D, N dimensional data, etc.), the shape (extent) of the data (e.g., range describing the lowest and highest possible indices for a given storage class), and/or other characteristics.

Figure 8A:
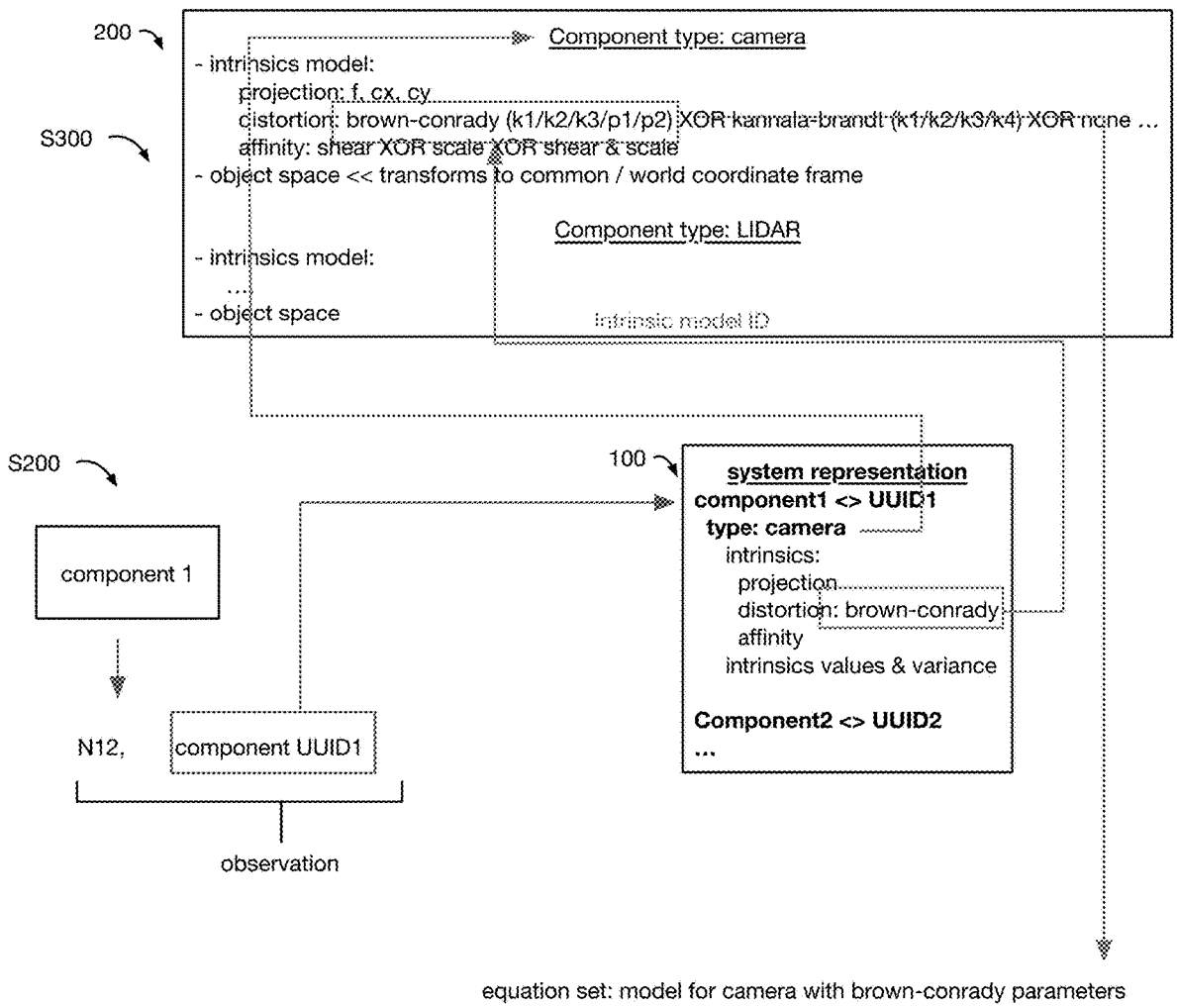
FIGS. 8A-8B are illustrative examples of determining the equation sets associated with observation streams, using components as the base modeled element.
Figure 8B:
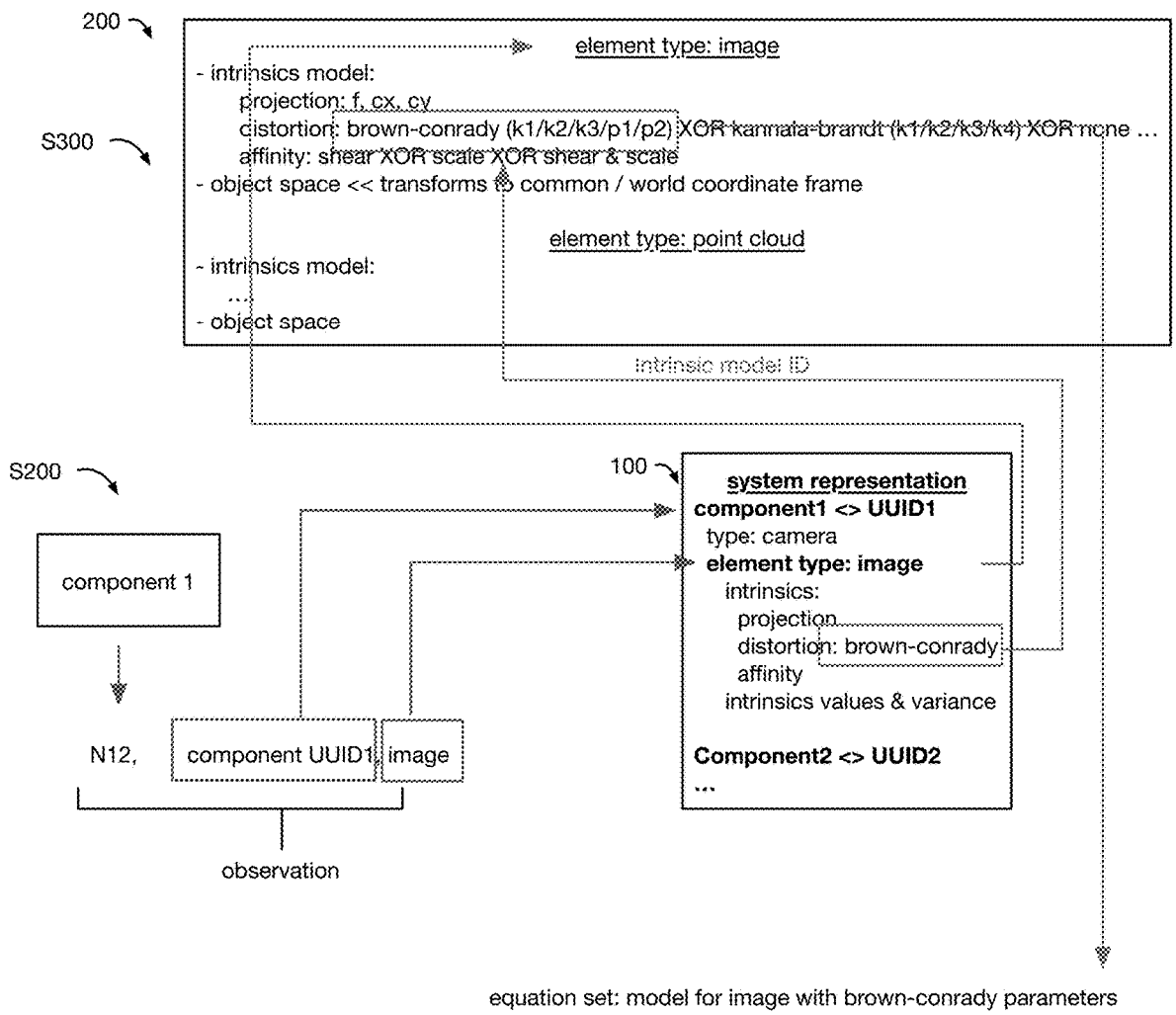

In a sixth variation, the element type can be the component type, or be an observation type defined by the component (e.g., component observation type); examples shown in FIGS. 8A-8B. Examples of component types can include: camera, LIDAR, radar, ultrasound, accelerometer, gyroscope, GNSS, encoder, and/or any other suitable component type. However, any other element type can be used.

However, an element type can be otherwise defined.

Figure 14:
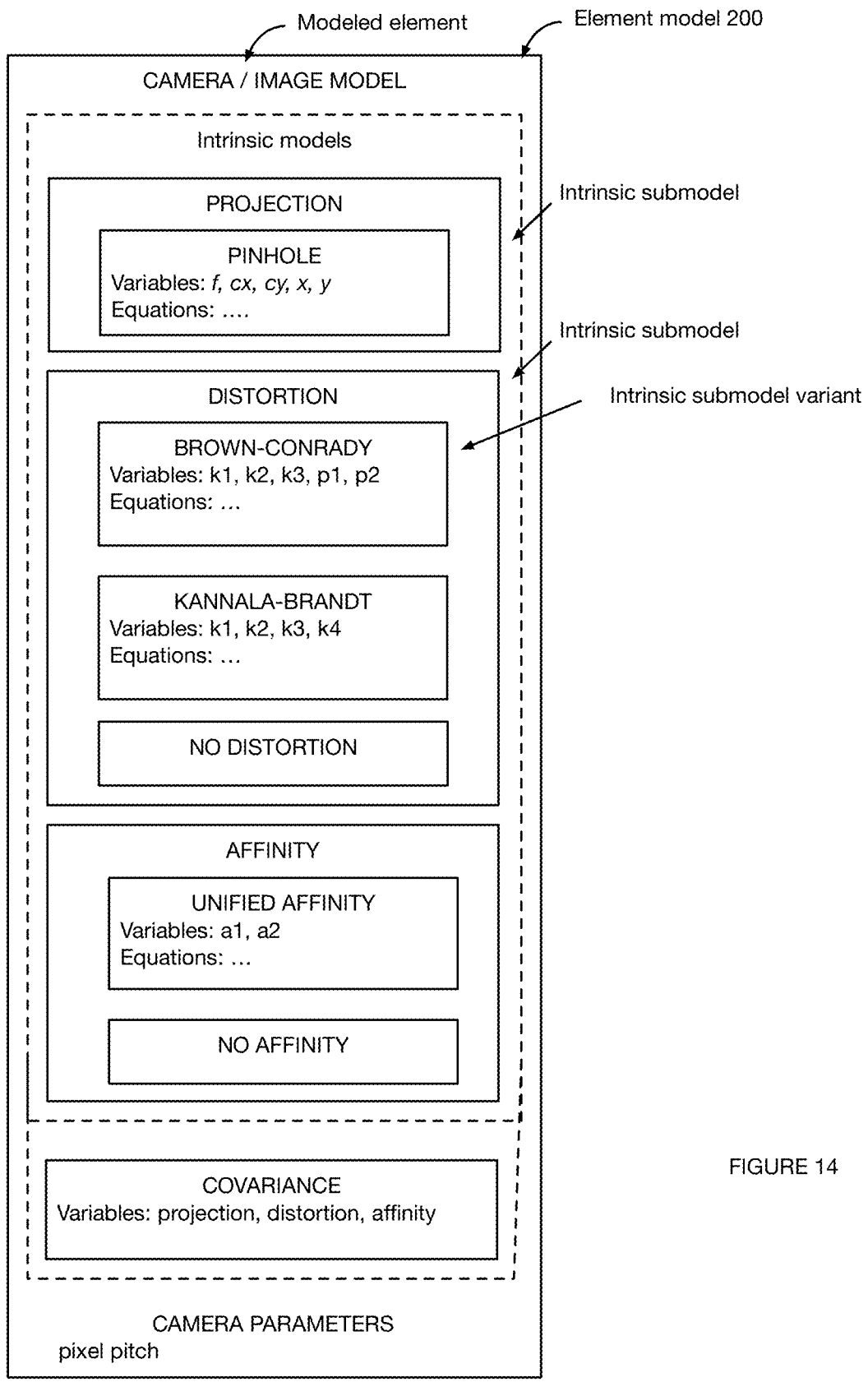
FIG. 14 is an illustrative example of an element model.

Each element model 200 can include: a model set for the element, a covariance for the models (e.g., for the model parameters), a set of configurable variables, and/or any other suitable component information (e.g., example shown in FIG. 14).

The model set for the element functions to define the candidate physics models that can be used to model each element (e.g., component, observation, etc.). Each model set can include one or more model subsets. The model subsets can include intrinsic subsets (e.g., transformation model set) (e.g., example shown in FIG. 14), and can additionally or alternatively include extrinsic subsets (e.g., to convert the global frame to the camera frame; to convert an observation pose to a global frame; to convert an observation pose to the component's reference frame; etc.), object space subsets, and/or other model subsets. Each subset can include one or more variables (e.g., parameters), one or more equations, one or more submodels, and/or other information.

The intrinsic subset can include one or more intrinsic models (e.g., transformation models; intrinsic submodels; etc.), which can be used to convert, correct, and/or otherwise transform an observation to homogeneous observation coordinates. Each intrinsic model can be associated with a set of variables (e.g., parameters) and a set of equations (e.g., from which the variables are determined), but can additionally or alternatively be associated with any other suitable information.

The set of intrinsic models can include a set of intrinsic submodels (e.g., a model for each intrinsic associated with the component, a submodel for each element intrinsic, etc.). The intrinsics modeled by the intrinsic submodels can be linear intrinsic parameters, nonlinear intrinsic parameters, and/or any other type of intrinsic (e.g., intrinsic parameter). Examples of intrinsics modeled by the intrinsic submodels can include: projection (e.g., relating objects in 3D space to depictions in 2D space), distortion (e.g., describing deviation from a perfect projection model), affinity (e.g., describing aberrations or defects in the image plane), bias, scale, range, azimuth, horizontal, altitude, click (e.g., modeling how far a radar click is off the beam path), position, count, ionosphere, troposphere, drift, and/or other parameters internal to the component itself. Each intrinsic submodel preferably models a single intrinsic, but can alternatively model multiple intrinsics. The intrinsic submodels available for each modeled element are preferably predefined, but can be otherwise defined. The combination of intrinsic submodels available within a modeled element's model set can vary across different modeled elements, or be the same across different modeled elements (e.g., wherein some are unused). The intrinsic submodels can be required (e.g., a submodel variant must be defined for the intrinsic submodel when the element model is used), optional (e.g., a submodel variant can be defined for the intrinsic submodel when the element model is used), and/or have any other suitable set of use requirements.

Variables (e.g., parameters) from the intrinsic submodels (e.g., transformation model variables) preferably collectively define the set of intrinsic variables (e.g., intrinsic parameters) for the element model 200; however, the intrinsic variables can be limited to variables (e.g., parameters) from a subset of the intrinsic models, or be otherwise defined.

Each intrinsic submodel can have one or more variants (e.g., transformation types, intrinsic model variants, intrinsic model options), wherein each intrinsic submodel variant can be associated with a different set of parameters and/or equations for the transformation (e.g., a different way to model the specific transformation type). Each intrinsic submodel variant is preferably a model itself (e.g., a transformation model, an intrinsic model), but can be otherwise constructed. For example, the variants for the distortion intrinsic submodel (e.g., distortion model) can include: Kannala-Brandt, Brown-Conrady, another distortion model, null (e.g., no distortion parameters), and/or have another type (illustrative example shown in FIGS. 7A-7C, FIGS. 8A-8B, and FIG. 14). The Kannala-Brandt distortion variant can populate the intrinsic model with and/or use Kannala-Brandt distortion parameters (e.g., k1, k2, k3, k4), the Brown-Conrady distortion variant can populate the intrinsic model with Brown-Conrady distortion parameters (e.g., e.g., k1, k2, k3, p1, p2), and other distortion variants can populate the intrinsics model with and/or use the respective distortion parameters. Similarly, the affinity submodel can be one of: scale, shear, scale and shear, another affinity model, null (e.g., no affinity parameters), and/or have another type. The scale affinity model variant can populate the intrinsics model with and/or use scale parameters, the shear affinity model variant can populate the intrinsics model with and/or use shear parameters, the shear and scale affinity model variant can populate the intrinsics model with and/or use shear and scale parameters, and other affinity model variant can populate the intrinsics model with and/or use the respective affinity transformations.

Intrinsic submodels and/or variants thereof can be shared across element models 200, or be specific to an element model. For example, both image models and acceleration models can have affinity models within the respective intrinsic model. All intrinsics can be available to all element models, or be limited for some element models. For example, scale, shear, and permutations thereof can be available for image models, while only scale is available for acceleration models.

One skilled in the art will recognize that the concepts discussed above can be referred to with alternative terminology. For example, the element model 200 can include a transformation model, intrinsics model, an extrinsics model, and an object space model, wherein each of the aforementioned models can have sub-models (e.g., transformations). For example, intrinsics sub-models can include: projection, distortion, affinity, bias, range error, vertical or azimuthal error, horizontal error, and/or other sub-models. Each sub-model or model variant can include one or more parameter sets, wherein each parameter set can be associated with a different equation set. For example, the distortion sub-model can include a Brown-Conrady distortion parameter set and Kannala-Brandt distortion parameter set. However, other terminology can be used to refer to said concepts.

Figure 7A:
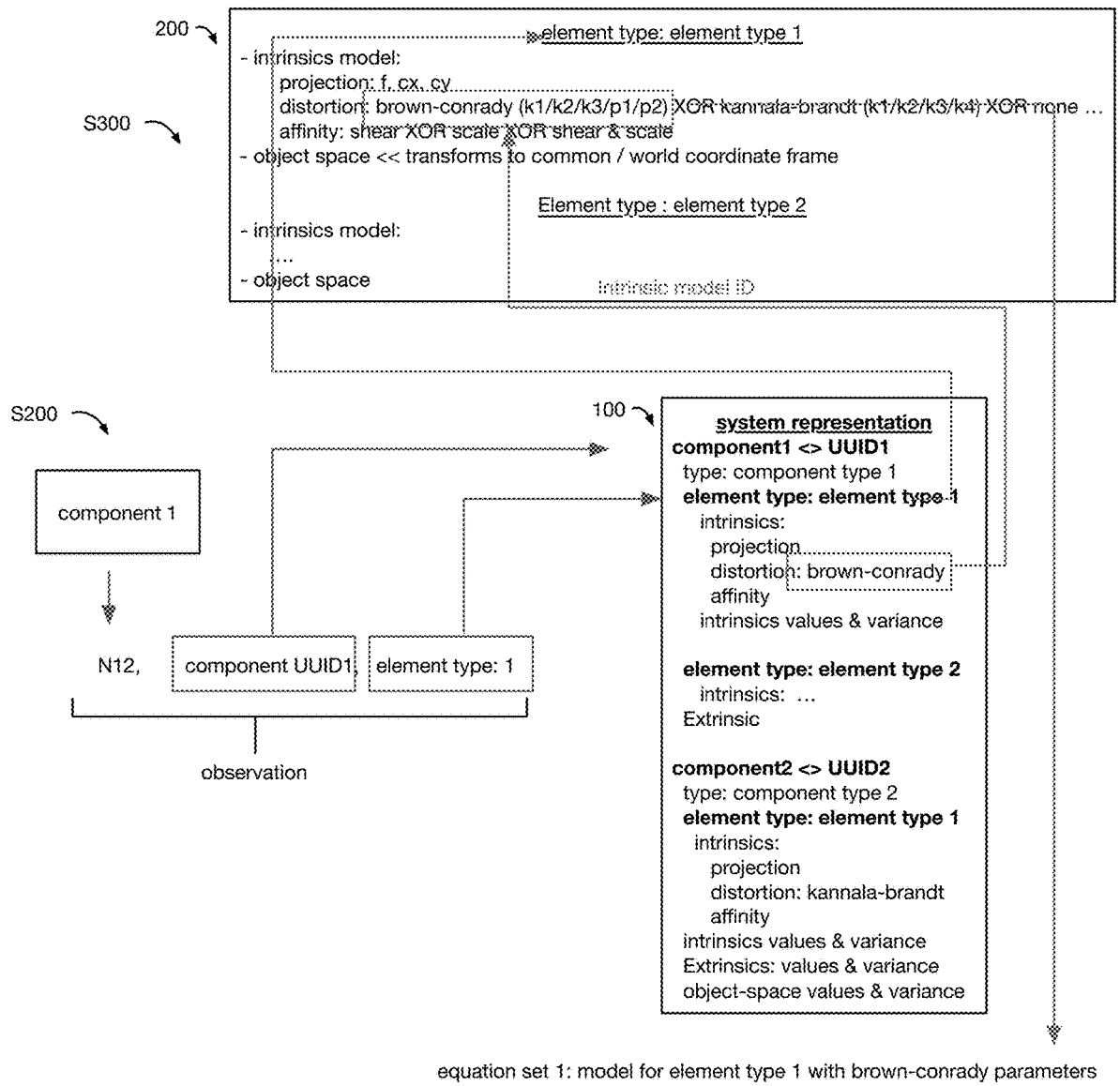
FIGS. 7A-7C are illustrative examples of generating equation sets for a first, second, and third observation stream, respectively.
Figure 7B:
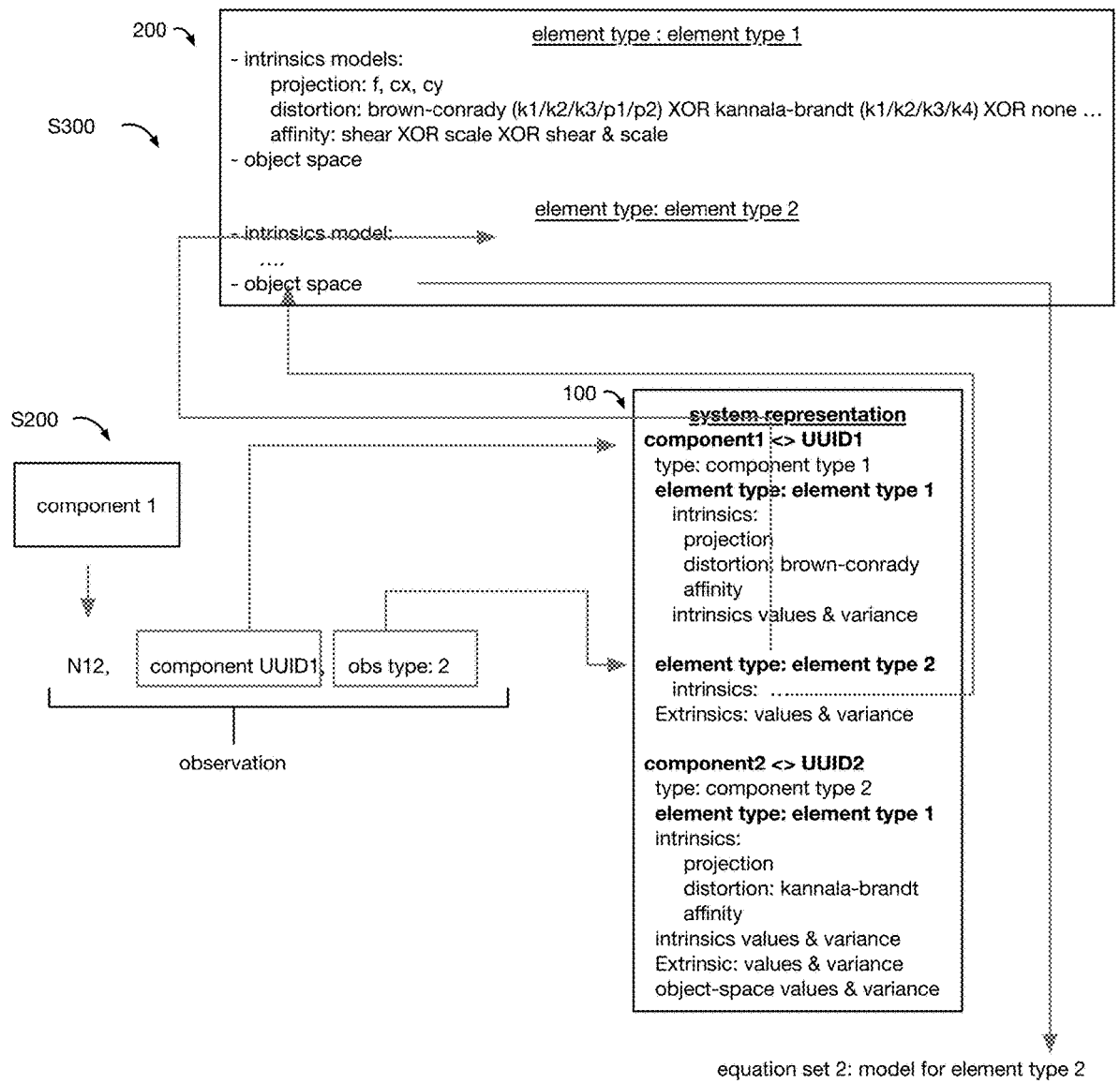
Figure 7C:
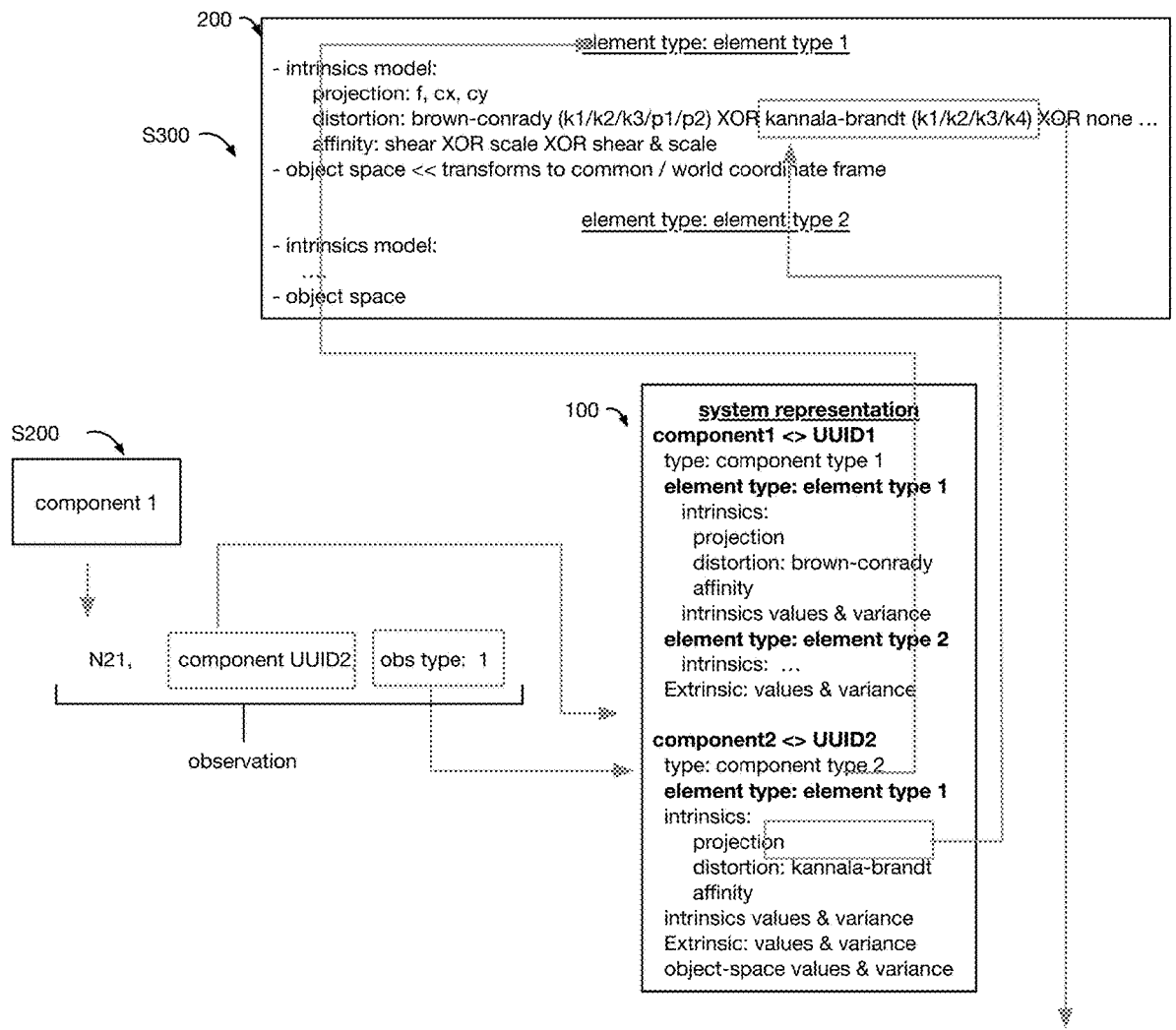

In an example, a camera model or image model (e.g., camera observation model, etc.) can include: a set of projection models (e.g., including a pinhole model variant), a set of distortion models (e.g., including a Brown-Conrady distortion model variant, a Kannala-Brandt distortion model variant, and a no distortion model variant), a set of affinity models (e.g., including a shear affinity model variant, a scale affinity model variant, and a shear and scale affinity model variant), and/or other submodels (illustrative example shown in FIGS. 7A-7C). In another example, a LiDAR model or point cloud model can include: a set of range models (e.g., wherein the parameters can include: rangefinder offset, scale error, laser axis vertical offset, periodic error, cyclic error, etc.), a set of azimuth/vertical models (e.g., wherein the parameters can include: scale error, horizontal circle eccentricity, non-orthogonality of encoder and vertical axis, collimation axis error, trunnion axis error, horizontal eccentricity of collimation axis, trunnion axis wobble, etc.), a set of altitude/horizontal models (e.g., wherein the parameters can include: vertical circle index error, scale error in encoder reading, vertical circle eccentricity, non-orthogonality of the encode and trunnion axis, vertical eccentricity of collimation axis, vertical axis wobble, etc.), and/or other submodels. In another example, a radar model or radar return model can include: a set of bias models, a set of scale models, a set of click intrinsics models (e.g., the intrinsics of each click off the central beam path; can be in spherical coordinates), a set of doppler models, a set of polarization models, a set of beam path models, a set of range models, a set of interference models, a set of clutter models, and/or other submodels. In another example, an accelerometer model or acceleration model can include: a set of bias models, a set of scale models (e.g., describing the axis alignment of the accelerometer; can use Euclidean dimensions), and/or other submodels. In another example, a gyroscope model can include: a set of bias models, a set of scale models, a set of radial position models, and/or other submodels. In another example, a wheel encoder model or encoder click model can include: a set of position models, a set of rotation count models, a set of circular collimation bias models, a set of circular collimation scale models, and/or other submodels. In another example, a GNSS model or location model (e.g., receiver/antenna pair model) can include: a set of receiver lock bias and skew models (e.g., for the internal receiver clock), a set of satellite orbital error models, a set of ionospheric (atmosphere) models, a set of tropospheric (atmosphere) models, a set of noise models, a set of multi-pathing models (e.g., can be specific to a given antenna/receiver pairings), a set of position estimation models, a set of velocity estimation models, and/or other submodels. In variants, the GNSS component representation 120 associated with the GNSS model can use the antenna location as the extrinsic reference, and use the receiver clock as the temporal reference. However, any other suitable element model can include any suitable intrinsic models.

The element model 200 can optionally include an extrinsic model, which can define how to transform the observations to the component's coordinate frame, and/or be otherwise used. The extrinsic model can be the same as the spatial constraint model, or be different. The extrinsic model can be the same across different element models, or be the same.

The object-space model can function to relate the component observations to an object space, can define the component's coordinate frame, or be otherwise used. The object space model can be: specified by each element model, specified by each component representation, be a global model (e.g., be specified by the system representation itself), and/or be otherwise defined. The object space model can be the same across different element models, or be the same. The object space (e.g., that the target object space model transforms the observation into) can be: the reference frame of a component, a global reference frame, a global representation (e.g., world or environment representation), and/or be any other suitable object space. The component representations (and/or constraint representations) within the same system representation preferably share a common object space, but can alternatively reference different object spaces.

The configurable variables can be specific to the element type or the observation type, and are preferably fixed and/or static component attributes (e.g., that do not change over time). Examples of component attributes can include: pixel type (e.g., RGB, thermal, IR, etc.), pixel pitch, lens type, emitter number, wavelength, GNSS network (e.g., GPS, GLONASS, Galileo, etc.), datum choice, and/or other parameters.

The set of covariances functions to model the confidence, precision, and/or error for a set of parameters (e.g., intrinsic parameters). The covariance can be specific to the model set, specific to the element model, and/or otherwise specific. Alternatively, the covariance can be generic. The covariance can relate the variance-covariance of the variables of the selected (sub)models within each model (e.g., an intrinsic covariance for each variable of each selected intrinsic model; an extrinsic covariance for each variable of the extrinsic model; etc.), or be otherwise defined.

However, the element models 200 can be otherwise defined.

3.3 System Representation.

The system representation 100 ("Plex") of the platform functions to represent a set of components 10, a set of relationships 30 (e.g., spatial relationships, temporal relationships, etc.), the associated calibration parameter values (e.g., intrinsic parameter values, extrinsic parameter values, synchronization values), and optionally the associated uncertainties (e.g., variances and/or covariances), but can additionally or alternatively represent any other suitable information. The system representation 100 can additionally store which models (e.g., physics models, element models, intrinsic models, etc.) to use for calibration and/or observation interpretation.

Figure 12:
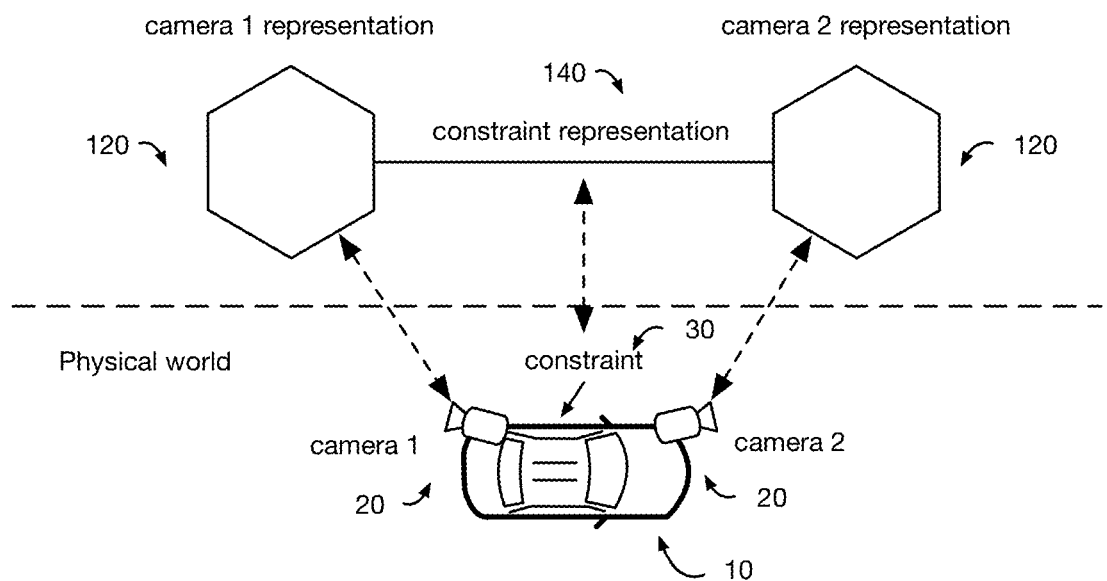
FIG. 12 is an illustrative example of the relationship between a system and the corresponding system representation.

The set of components 10 can be: the sensors within a device, the sensors within a system, a user-defined set of sensors, and/or any other suitable set of sensors. Each system representation 100 preferably represents a single system, but can alternatively represent multiple systems. The system representation 100 preferably represents each component 20 within the system 10 and each relationship 30 relating each component set (e.g., examples shown in FIG. 12 and FIG. 13A), but can alternatively represent a subset of the components, a subset of the constraints, other components, other constraints, and/or any other suitable set of components and constraints.

Each system representation 100 preferably represents a single system, but can alternatively represent multiple systems. In an example where the platform manages the calibrations for a fleet of similarly-constructed systems, a single system representation 100 can be associated with all systems within the fleet before calibration, wherein a different system representation 100 (e.g., a different instance of the fleet's system representation 100) is generated for each system post-calibration. Each system is preferably associated with a single system representation 100, but can alternatively be associated with multiple system representations 100 (e.g., multiple instances of the same system representation 100, etc.).

The system representation 100 is preferably stored as a single file, but can alternatively be stored as multiple files. The system representation 100 can be stored as a configuration file (e.g., JSON configuration file), as a text file, and/or stored using another file type. The representation can be stored locally (e.g., on a device, on the system), remotely (e.g., on a platform, a cloud computing system, etc.), and/or otherwise stored.

The system representation 100 can be determined once, iteratively redetermined, determined upon occurrence of a trigger event (e.g., component loss event), and/or determined at any other time. The system representation 100 is preferably determined or updated atomically (e.g., as a whole), but can alternatively be determined piecemeal (e.g., wherein only a subset of the component representations 120 or constraint representations 140 are modeled and/or updated). The system representation 100 can be manually determined, automatically determined, and/or otherwise determined.

Determining the system representation 100 can include determining a structure of the system representation 100 (e.g., collectively formed by the component representations 120, the component representation configurations, and/or the constraint representations 140), and determining the calibration parameter values (e.g., the intrinsic parameter values and extrinsic parameter values).

The system representation structure can be manually determined, automatically determined, and/or otherwise determined. In a first variant, a user specifies the system representation 100. In a first embodiment, the user can programmatically specify the system representation 100 (e.g., examples shown in FIGS. 11A-11F) using one or more programming languages (e.g., JSON, Python, Rust, C, C++, Java, etc.). In a second embodiment, the user can graphically specify the system representation 100 (e.g., using a drag-and-drop interface, using a no-code interface, etc.). In this embodiment, each icon can be representative of a component, observation, or other modeled element, wherein the component parameters (e.g., which transformation models to use, what starting parameter values to use, etc.) can be selected from a set (e.g., list, menu) of options associated with the respective component icon. In a second variant, the system representation 100 can be automatically determined. In a first embodiment, new component representations 120 can be created within the system representation 100 for each new component that is connected to the system (e.g., detected by the processing system, registered with the processing system, etc.). In this embodiment, the constraint representations 140 can be: manually determined (e.g., programmatically defined, graphically defined based on a length of a connection between component representations 120, etc.), randomly determined, inferred (e.g., based on connection order, based on the component types, based on semantic relationships, etc.), learned, and/or otherwise determined. For example, constraint representations 140 (e.g., for spatial constraints, temporal constraints, semantic constraints, etc.) can be defined between all components that were concurrently detected or all components that are semantically grouped (e.g., by a user). In a second embodiment, a previously-determined system representation 100 can be retrieved for a new system sharing similar parameters with the old system (e.g., same version number, same fleet, same owner, etc.).

The calibration parameter values are preferably learned (e.g., via an optimization), but can alternatively be manually determined.

However, the system representation 100 can be otherwise determined.

The system representation 100 can include: a set of component representations 120 and a set of constraint representations 140. However, the system representation 100 can include any other suitable information.

Figure 5:
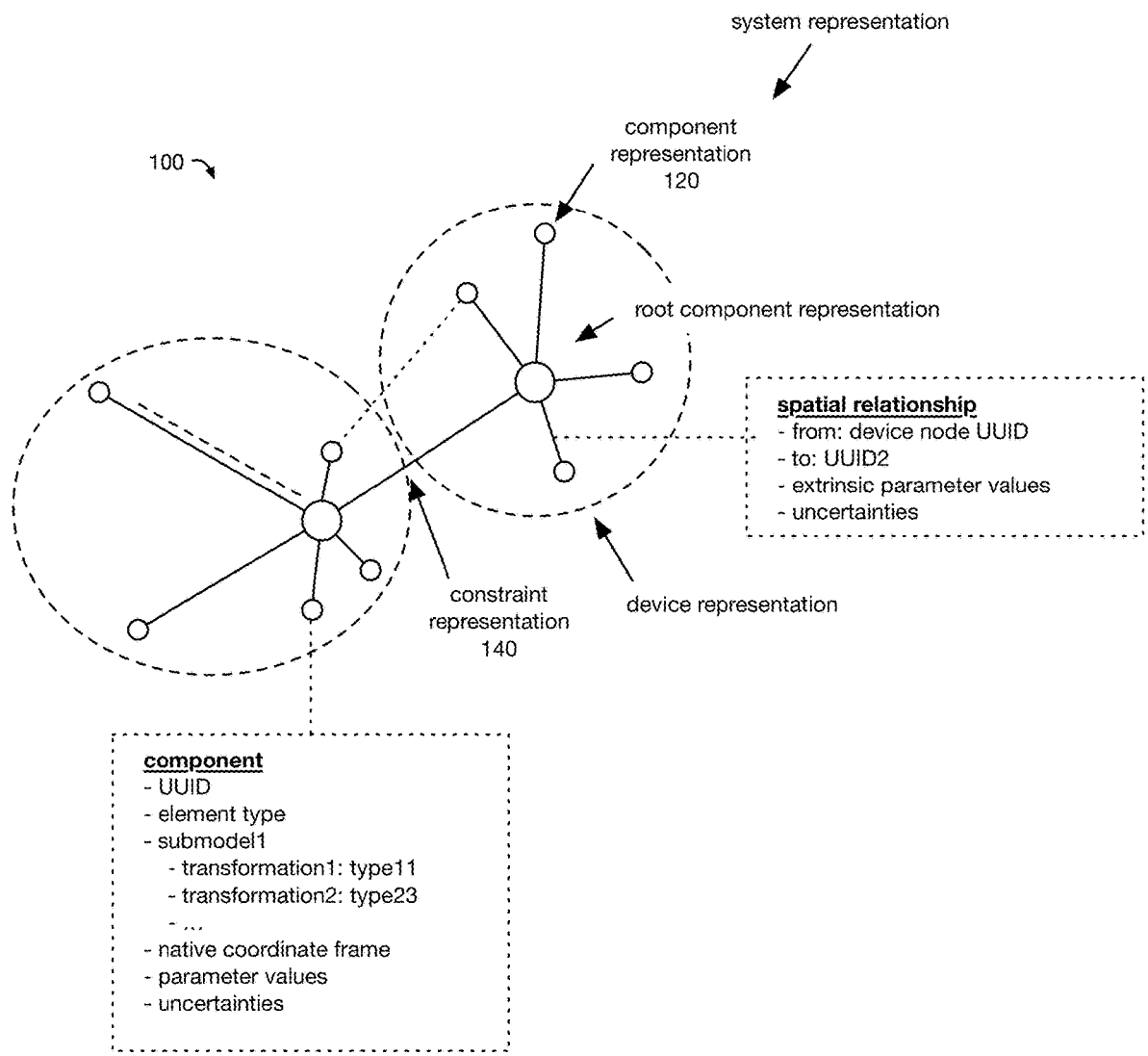
FIG. 5 is an illustrative example of a system representation.

The system representation 100 preferably conceptually defines or is stored as a graph representation (illustrative example shown in FIG. 5), but can alternatively be a lookup table, relationship table, and/or other data structure. The graph is preferably fully connected, undirected, incomplete, and acyclic, but can additionally or alternatively be partially connected, directed, complete, cyclic, underconstrained, overconstrained, and/or be otherwise configured. The component representations 120 preferably form the nodes of the graph, while the constraint representations 140 form the edges connecting the nodes.

The component representations 120 function to represent the components of the system. Each component representation 120 preferably represents a single component, but can alternatively represent multiple components. Each component is preferably represented by a single component representation 120 within the system representation 100, but can alternatively be represented by multiple component representations 120 (e.g., in variants where the component representations 120 are defined based on observation types instead of components). The set of component representations 120 within the system representation 100 can be: manually determined, automatically determined (e.g., generated upon component connection to or detection by a common processing system; based on component identifiers extracted from the observation streams; etc.), and/or otherwise determined.

Each component representation 120 (e.g., "component", "node", etc.) can be associated with component data. Component data can include: a component identifier (e.g., the component UUID), a semantic name (e.g., a semantic identifier), an element identifier (e.g., component type; observation type; which element model to use), a set of model identifiers (e.g., identifying which intrinsic model, intrinsic submodel, intrinsic submodel variant, etc. to use), parameter values (e.g., intrinsic parameter values, extrinsic parameter values, etc.), covariance values (e.g., parameter uncertainty; variance-covariance matrix for the parameters), configurable variable values (e.g., supported image formats, streaming configurations, etc.), the native coordinate frame (e.g., x/y/z directionality, left vs. right handed), and/or other data. In examples, the model identifiers can include an intrinsic submodel variant identifier for each of a set of intrinsic submodels for the element (e.g., which distortion model to use, which affinity model to use, etc.), wherein the set of intrinsic models can be fixed or variable (e.g., required or dynamically selectable). In variants, the component representation can exclude (e.g., not store) the model equations themselves; alternatively, the component representations can store the model equations.

The component identifier is preferably a unique identifier for the component generating the observation, and links the observation (and the associated model) to the component-specific details (e.g., intrinsic models, parameter values, uncertainties, etc.). In operation, the component identifier in the observation metadata can be used to identify the component representation 120 representing the source component generating the observation, wherein the observation can be interpreted using the component data stored in the component representation 120. However, the component identifier can be otherwise used. The component identifier can be locally unique (e.g., unique within the host sensor calibration representation, non-unique across different sensor calibration representations, etc.), globally unique (e.g., across different sensor calibration representations, etc.), and/or otherwise defined. The component identifier can be automatically determined, randomly generated, generated from a device identifier, be a manufacturer's identifier (e.g., IMEI number), and/or otherwise determined.

The semantic name functions as a human-readable identifier for the component (e.g., the sensor, the sensing unit). The semantic name can be manually determined, automatically determined (e.g., based on a semantic constraint, based on a manufacturer's make and model for the component, etc.), and/or otherwise determined.

The element identifier (e.g., element type) functions to determine which element model 200 to use (e.g., which model set to use). The element identifier can be manually assigned, automatically assigned (e.g., wherein the component's make and model or UUID can be associated with a known element type), determined based on the observation type(s) output by the component, and/or otherwise determined. The element identifier is preferably selected from a set of element types that are standard to the platform, but can be otherwise selected. Each component representation 120 is preferably associated with a single node type, but can alternatively be associated with multiple node types (e.g., a component capable of outputting different observation types can have multiple node type associations). In an illustrative example, a depth camera sensor can output an image and a point cloud can be represented by a component representation 120 specifying an image observation type and a point cloud observation type.

The intrinsic submodel variant identifiers function to determine which intrinsic submodel variants to use for the component. In variants, the intrinsic submodel variant identifiers can be used to retrieve the equation sets and/or parameter sets associated with the identified intrinsic submodel variant for use in observation interpretation and/or calibration. The intrinsic submodel variant identifiers can be: manually specified, automatically specified (e.g., when only one variant is available; a default variant; etc.), and/or otherwise determined.

The parameter values function to specify the calibration values for the represented component. The parameter values preferably include intrinsic parameter values, but can additionally or alternatively include extrinsic parameter values and/or object space parameter values for the component. The parameter values preferably include a value for all or a subset of parameters from a parameter set. The parameter set can include all or a portion of the parameters from each equation associated with each intrinsic submodel variant identified in the component representation 120, include all or portion of the parameters from each extrinsic model associated with the element model 200, include all or portion of the parameters from each object-space model associated with the element model 200, include manually-specified parameters, or be otherwise defined. The parameter values are preferably determined via calibration (e.g., using an optimization, such as a bundle adjustment or Kalman filter), but can alternatively be manually specified, retrieved (e.g., from a prior calibration round), and/or otherwise determined.

The covariance values function to define the uncertainty for each parameter of the parameter set, or for any other suitable set of parameters. The component representation 120 can include one or more covariance sets. For example, the component representation 120 can include a covariance set for each submodel (e.g., intrinsic covariance set, extrinsic covariance set, object-space covariance set, etc.), or include a single covariance set for the component representation 120 as a whole. The covariance values are preferably determined via calibration (e.g., using an optimization, such as a bundle adjustment or Kalman filter), with the parameter values, but can alternatively be manually specified, retrieved (e.g., from a prior calibration round), and/or otherwise determined.

The configurable variable values function to specify values for fixed or fixable component attributes. Examples of configurable variables can include: pixel pitch, supported image formats, streaming configurations, frame rate, frame size, and/or any other suitable static attribute. The configurable variable values can be determined: manually, automatically (e.g., by analyzing the component, the observation, etc.), and/or otherwise determined.

However, the component representations 120 can include any other suitable information.

The component representation 120 can be a sensing unit representation, a reference representation, and/or another type of component representation 120, wherein different types of component representations 120 can support different component data, be capable of association with different constraint representations 140 (e.g., capable of accepting different constraints), and/or otherwise differentiated.

In a first variant, the component representation 120 is a sensing unit representation (e.g., sensor representation), wherein the component representation 120 includes at least a component identifier, a set of intrinsic submodel variant identifiers, and a set of parameter values (intrinsic parameter values). The sensing unit representation can accept all constraint representations 140 (e.g., spatial constraints, temporal constraints, semantic constraints, etc.), or be limited to accepting a subset thereof.

In a second variant, the component representation 120 is a non-sensing reference unit representation.

Figure 13A:
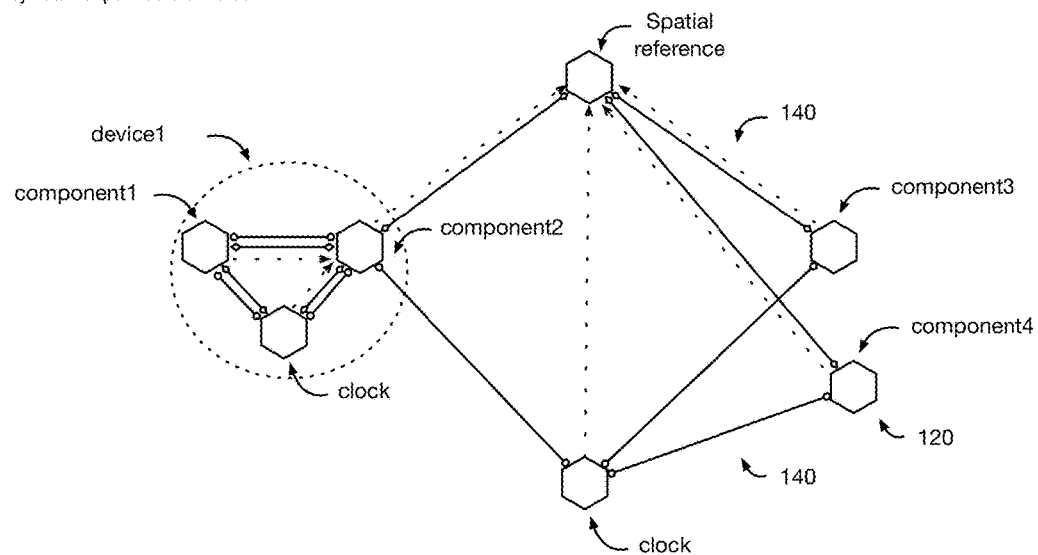
FIG. 13A is an illustrative example of a system and associated system representation 100.
Figure 13A:
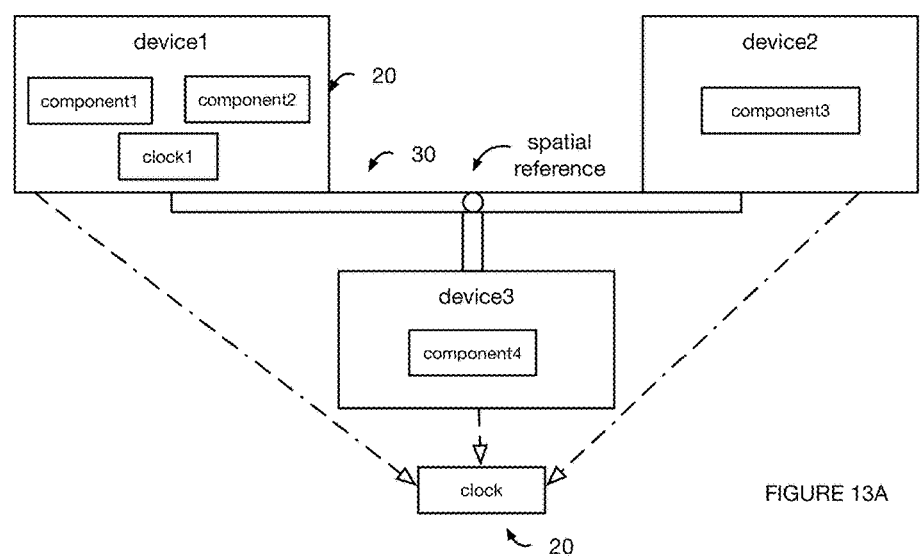
Figure 13B:
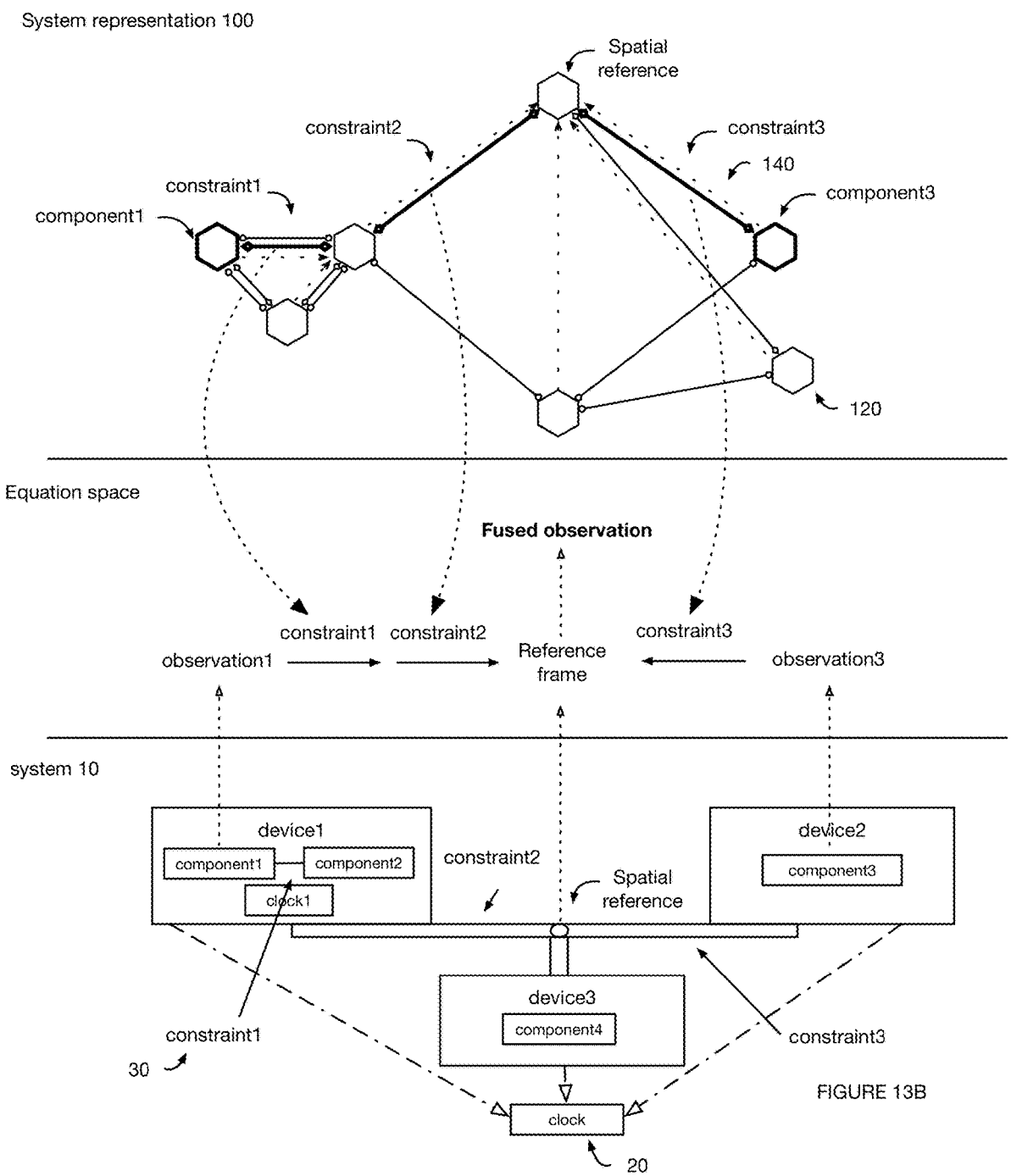
FIG. 13B is an illustrative example of sensor fusion.

In a first embodiment, the non-sensing reference unit representation is a spatial reference representation (e.g., anchor node), representative of a point in space (e.g., example shown in FIG. 13A and FIG. 13B). The spatial representation can lack intrinsic information (e.g., intrinsic submodel variant identifiers, intrinsic parameter values, etc.), lack the ability to be connected by temporal representations (e.g., refuse temporal constraints), only accept spatial constraints and semantic constraints, not be associated with an observation stream (e.g., the represented component will not output observations), and/or be otherwise defined.

In a second embodiment, the component representation 120 is a temporal reference representation, representative of a clock or other temporal sensor (e.g., example shown in FIG. 13A and FIG. 13B). The temporal reference representation can lack intrinsic information (e.g., aside from drift); lack the ability to accept spatial constraints; and/or be otherwise defined.

However, the component representations 120 can be otherwise defined.

The constraint representation 140 functions to represent a relationship (e.g., spatial constraints, temporal constraints, semantic relationships, etc.) between two or more components within a system (e.g., physical components within a physical system).

Each constraint representation 140 (e.g., "constraint", "edge") can be associated with a set of component representations 120, a set of constraint parameters, a set of constraint parameter values, a set of uncertainties, and/or any other information.

Each constraint representation 140 can be associated with a set of component representations 120. The component representations 120 preferably represent the components that are related by the constraint represented by the constraint representation 140, but can be otherwise defined. Each constraint representation 140 is preferably associated with (e.g., connected to) two component representations 120, but can alternatively be associated with a single component representation 120. Each component representation 120 can be associated with one or more constraint representations 140.

The constraint representations 140 can optionally specify a direction between the constraint representations 140 of the set. The constraint representations 140 can be directional (e.g., include a reference component and a target component, a "to" and "from", respectively), be bidirectional, or be undirected. The directionality of the constraint representation 140 can be dependent upon the constraint representation type, be manually assigned, and/or be otherwise determined. The directionality of the constraint representation 140 can be used to determine which component representation's reference frame (e.g., spatial frame, temporal frame) to transform into, and/or determine which component representation's reference frame to transform, or be otherwise used. For example, a directional constraint representation 140 can be defined as transforming a pose or time of the reference component into the coordinate frame or temporal basis of the target component, or be otherwise defined. In this variation, the edge parameters can be inverted when traversing the graph from the "from" to the "to" component.

Each constraint representation 140 can be associated with a constraint model. The constraint model associated with the constraint representation 140 is preferably determined based on the constraint representation's type (e.g., spatial models for spatial constraints, temporal models for temporal constraints, etc.), but can be otherwise determined. A different instance of the constraint model is preferably used (e.g., populated into the calibration equation set) for each instance of the constraint representation type appearing within a system representation; alternatively, a single constraint model instance can be used for multiple constraint representations, or any other suitable cardinality between constraint representations and constraint model instances can be used.

Each constraint representation 140 can be associated with a set of constraint parameters. Examples of constraint parameters can include: extrinsic parameters (e.g., for spatial constraints), synchronization parameters (e.g., for temporal constraints), and/or other parameters describing a relationship between the represented components. Extrinsic parameters can include translation and/or rotation (e.g., x, y, z, r, θ, and φ), and/or other parameters. Synchronization parameters can include offset (e.g., epoch offset between two clocks; can have units in integer nanoseconds, microseconds, etc.), skew (e.g., scale offset between two clocks; can be unitless), and/or other parameters. The constraint parameter associated with the constraint representation 140 preferably depends on the constraint representation 140's type, but can be otherwise determined.

Values for the constraint parameters can be determined: via calibration (e.g., using an optimization, such as a bundle adjustment or Kalman filter), with the component parameter values, but can alternatively be manually specified, retrieved (e.g., from a prior calibration round), and/or otherwise determined.

The constraint representations 140 can optionally be associated with a set of constraint uncertainties for each parameter of the constraint parameter set, or for any other suitable set of parameters. The constraint uncertainty values are preferably determined via calibration (e.g., using an optimization, such as a bundle adjustment or Kalman filter), with the constraint parameter values, component parameter values, and/or component covariance values, but can alternatively be manually specified, retrieved (e.g., from a prior calibration round), and/or otherwise determined.

In a first variation, the constraint uncertainties can include constraint covariances (e.g., variance-covariance matrix), which function to define the uncertainty for each parameter of the extrinsic parameter set.

In a second variation, the constraint uncertainties can include resolution, which can define the resolution to which the synchronization should be applied (e.g., define how far from an observation's timestamp to search for a synched pair, or to describe a degree of precision or confidence in a timestamp once synchronized).

However, the constraint uncertainties can include any other type of uncertainty.

In variants, the constraint uncertainties values can be used to determine which set of constraint representations 140 to use when transforming a first component's observation into a second component's reference frame. For example, the constraint representation 140 set connecting the two components (e.g., constraint representation 140 path; set of connected constraint representations 140; etc.) with the smallest overall covariance can be used to determine the transformation, which can ensure that the transformation has the highest confidence and/or precision is used. In an illustrative example, when traversing for spatial constraints within the system representation 100, the constraint returned can contain the extrinsic(s) with the minimum overall covariance, which can ensure that the extrinsics with the smallest covariance (e.g., highest confidence and/or precision) are returned, even if multiple spatial constraints exist between any two components. However, the constraint covariance values can be used to calculate the error on the transformation (e.g., in addition to the component covariance values) and/or otherwise used.

However, the constraint representations 140 can be otherwise configured.

Figure 10:
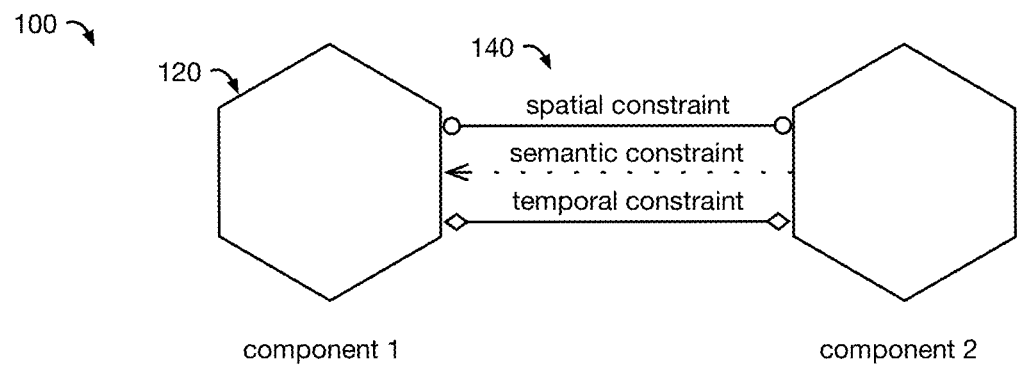
FIG. 10 is a schematic representation of example constraints connecting two component representations.

The platform can support one or more constraint representation types, which can include: spatial constraint representations 140, temporal constraint representations 140, semantic constraint representations 140, and/or any other suitable constraint representation type (e.g., example shown in FIG. 10). Each constraint representation type can have a different set of attributes or configurations.

Spatial constraint representations 140 (e.g., "spatial constraints") function to represent spatial constraints (e.g., spatial relationships) between two or more components. In variants, the spatial constraint representations 140 can include: extrinsic parameters, extrinsic covariances, a direction (e.g., a reference component and a target component), and/or other elements (e.g., example shown in FIG. 11C). The spatial constraint representation is preferably capable of connecting (e.g., relating) sensing unit component representations 120 and spatial component representations 120, but cannot connect to temporal component representations 120. However, the spatial constraint representations 140 can be otherwise configured.

Temporal constraint representations 140 (e.g., "temporal constraints) function to represent temporal constraints (e.g., temporal relationships) between two or more components. In variants, temporal constraint representations 140 can include: synchronization (e.g., offset, skew, etc.), resolution, a direction (e.g., a reference component and a target component), and/or other elements (e.g., example shown in FIG. 11D). The temporal constraint representation is preferably capable of connecting (e.g., relating) sensing unit component representations 120 and temporal component representations 120, but cannot connect to spatial component representations 120. However, the temporal constraint representations 140 can be otherwise configured.

Semantic constraint representations 140 (e.g., "semantic constraints") function to semantically relate two or more components. The semantic constraint preferably does not have a physical world analog, but can alternatively be defined by functional groupings, spatial groupings, and/or otherwise defined. The semantic constraint is preferably specified by a user, but can alternatively be automatically defined (e.g., wherein all component representations 120 from the same device are related with a semantic constraint). In variants, the semantic constraint representation can include: a semantic identifier, optionally a direction, and/or other elements. The semantic constraint representation can be used to identify clusters (e.g., subtrees, subgraphs, etc.) of constraint representations 140. For example, the semantic constraint representations 140 can be used to determine which component representations 120 belong to which sensor stack on a system. When the semantic constraint representation is directional, the semantic constraint representation can point toward a root component (e.g., parent component), wherein the root components of different clusters can be related to semantically relate the clusters. In variants, the semantic constraint representations 140 can be used as hints to identify missing constraint representations 140 (e.g., spatial constraints, temporal constraints, etc.) (e.g., using a set of heuristics, etc.). For example, spatial and/or temporal constraint representations 140 can be automatically populated between component representations 120 that are connected by a semantic constraint representation but not otherwise connected. However, the semantic constraint representations 140 can be otherwise configured.

Each system representation 100 can include a set of constraint representations 140 relating (e.g., connecting) the set of component representations 120. Each constraint representation 140 can relate two or more component representations 120 together, wherein a constraint representation 140 can represent the constraint between the respective represented components. Alternatively, the system representation 100 can include no constraint representations 140.

The constraint representations 140 within a system representation 100 can be: manually defined, automatically defined (e.g., randomly determined, learned, etc.). and/or otherwise defined. In a first variation, the constraint representations 140 are randomly defined. In a second variation, the component representations 120 of a device are connected to a device component representation 120 ("root node"), and all component representations 120 are connected (e.g., directly or indirectly). The device component representation 120 can be: a component of the device (e.g., real or virtual component), a component representation 120 that represents the device as a whole (e.g., does not have an associated real or virtual component, represents the center of the device housing, etc.), an arbitrary point, or be otherwise defined. Inter-device component representation 120 connections can be defined manually, randomly, based on heuristics, based on measurements of global reference points (e.g., based on measured height), and/or otherwise defined. In a third variation, the constraint representation 140 are defined manually. In a fourth variation, the constraint representation 140 are defined according to a set of heuristics (e.g., based on relative latency, based on whether there is a semantic relationship, etc.). However, the constraint representations 140 can be otherwise defined.

The set of constraint representations 140 preferably cooperatively defines a fully connected graph within the system representation 100, such that the spatial and/or temporal relationship between any two components can be determined by traversing the graph, but can alternatively define a partially connected graph. The spatial and/or temporal relationship between two components can be determined using: the shortest path, the least uncertain path (e.g., the path with the smallest overall covariance), and/or any other suitable path.

In operation, the system representation 100 can be used to: interpret observations (e.g., generate calibrated observations), convert observations between different reference frames, fuse observations, calibrate the system, and/or be otherwise used. In a first example, the system representation 100 is used to interpret observations from the components within the system. In a second example, the system representation 100 is used to convert an observation into a target coordinate frame by identifying a path of constraint representations 140 connecting the source component's representation to the target component's representation. The path constraint parameter values for each constraint parameter, with the optional uncertainties, can be used to transform the observation to the target coordinate frame. In a third example, the system representation 100 is used for sensor fusion by identifying the constraint representation 140 paths connecting the component representations 120 for the source components generating the to-be-fused observations, and fusing the observations based on the identified paths. In a fourth example, a calibration equation set can be optimized (e.g., using a bundle adjustment, Kalman filter, etc.) to determine the calibrated parameter values (e.g., to calibrate the system), wherein the calibration equation set can be generated using the system representation 100. In an example, the calibration equation set can be compiled from the equations associated with each component representation 120 (e.g., including the equations specified by the intrinsic submodel variants identified in each component representation 120) and the equations associated with each constraint representation 140 can be compiled into the calibration equation set, and can optionally be seeded with the component parameter values and constraint parameter values from the respective component representations 120 and constraint representations 140.

However, the system representation 100 can be otherwise configured and/or used.

The platform can additionally include or interface with a processing system, which functions to: create, update, store, and/or utilize the system representation 100 for each of a set of systems, generate the calibration equation sets for each system representation 100, optimize the calibration equation set, fuse observations using the system representation 100, determine the set of reference frame transformations (e.g., the constraint representations 140) to use for a transformation, and/or perform any other set of functionalities. The processing system can execute all or a portion of the method.

The processing system can be distributed, local, remote, and/or otherwise configured. In a first variant, the processing system is a distributed computing system. In a second variant, the processing system is a local computing system (e.g., onboard the system). The local computing system can use the calibrated system representation 100 of the system to interpret component observations, and optionally control the device based on the component observations (e.g., use calibrated system representation 100 to fuse observations to increase accuracy). In a third variant, the processing system is a remote computing system (e.g., cloud computing system). The remote computing system can calibrate the system representation 100, optionally use the calibrated system representation 100 to interpret component observations, and/or perform other functionalities. However, the processing system can be otherwise configured.

The platform can optionally include a runtime environment, which functions to generate calibrated observations from raw measurements using the system representation 100 (e.g., during runtime). The runtime environment can be the same as or separate from the processing system.

The platform can optionally include a set of feature extractors, which function to extract features from the raw measurements for calibration and/or runtime use. The feature extractor can be selected for use based on the element type (e.g., component type) and object-space type combination for the desired observations, based on the raw measurement type, or otherwise selected.

The platform can optionally include an observation parser, which functions to extract data (e.g., observation values, observation type, component UUID, etc.) from each observation or stream thereof.

The platform can optionally include a calibration module, which functions to calibrate the system based on observations from the system and a calibration equation set determined from the system's representation (e.g., optimize the calibration equation set based on the observation values). The calibration module can leverage nonconvex optimization methods, Bayesian filtering-based methods (e.g., when all observation types are time-variant, such as Kalman filters, EKFs, etc.), bundle adjustment (e.g., when all observation types are time invariant), tight or loose coupling (e.g., when the observation types include a combination of time variant and invariant observations; selected based on the associated uncertainties of the parameters), and/or other optimization methods. The calibration module can use the equations and values associated with the component representations 120 and constraint representations 140 defined within the system representation 100 for the calibration.

4. Method

Figure 2:
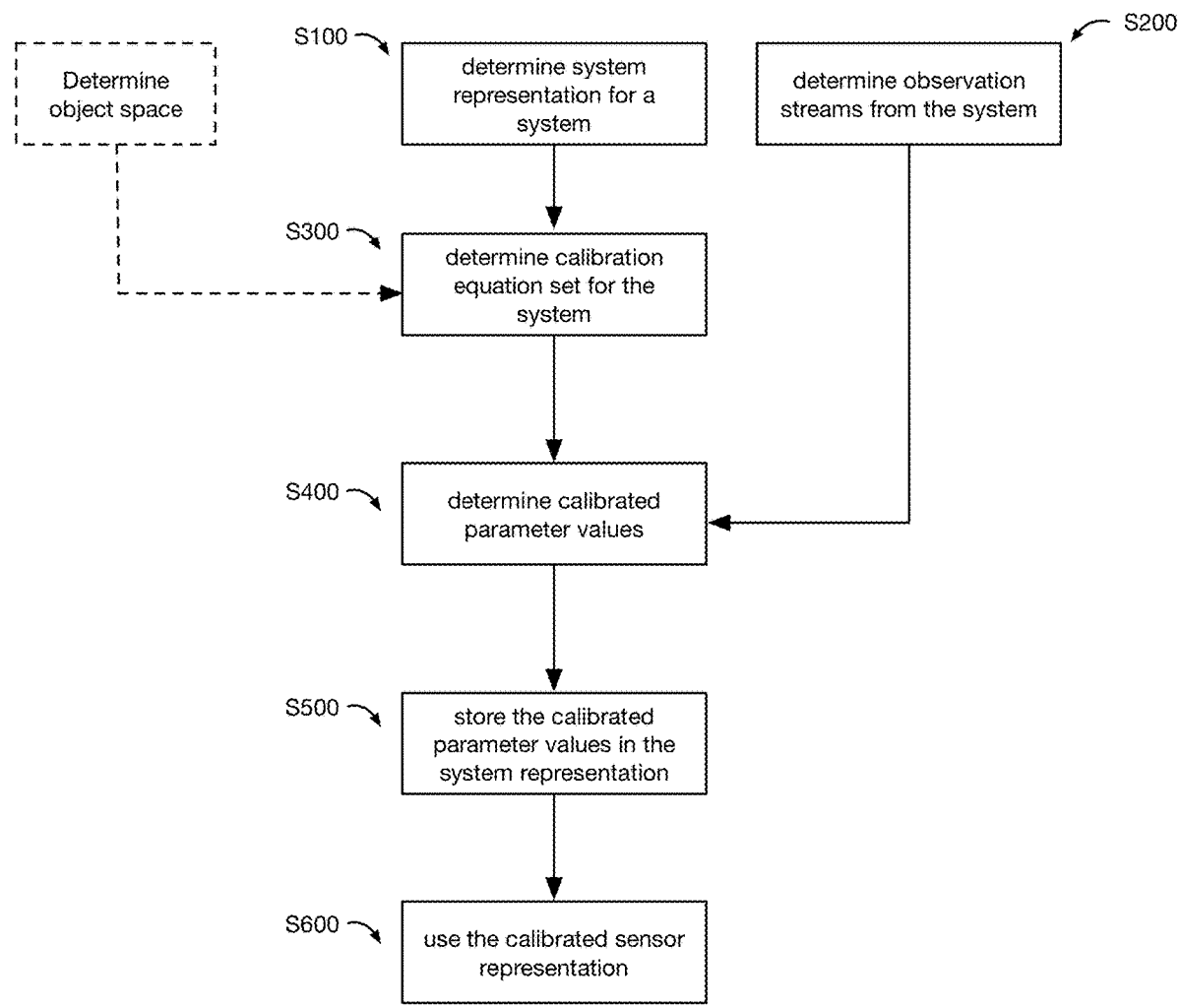
FIG. 2 is a schematic representation of a variant of calibrating a system.

As shown in FIG. 2, variants of the system calibration method can include: determining the system representation for a system S100; determining the observation streams from the system S200; determining a calibration equation set for the system S300; determining calibrated parameter values using the calibration equation set and observation values from each observation stream S400; and storing the calibrated parameter values for each component in association with the respective component identifier S500. The method can additionally or alternatively include using the calibrated system representation 100 S600.

The system representation 100 can be calibrated: continuously, periodically, in response to a calibration event, or at any other suitable time. Examples of calibration events include: a missing observation stream (e.g., indicative of a missing or offline component), calibration request receipt, an error exceeding a threshold, and/or another calibration event.

The system representation 100 can be calibrated as a whole (e.g., atomically), wherein all components and constraints are calibrated in the same calibration (e.g., optimization). Alternatively, the system representation 100 can be calibrated piecemeal, wherein a subset of the components and constraints are calibrated in the same calibration (e.g., only equations for a subset of the components and constraints appear in the calibration equation set). However, any other suitable portion of the system representation 100 can be calibrated during a given calibration iteration.

Determining the system representation for a system S100 functions to determine the information needed to configure the components of the system. The system representation 100 can be determined: once (e.g., during initial system setup), periodically (e.g., every 12 hours), in response to an event (e.g., when a new sensor is added, when a sensor is disconnected, etc.), for every calibration iteration, and/or at any other time. The system representation 100 can be determined: manually (e.g., programmatically, graphically, etc.), automatically, and/or otherwise determined.

S100 can include: determining the component representations 120, and determining the constraint representations 140.

Determining the component representations 120 function to define representations for each component within the represented system. Determining the component representations 120 can include determining the element type (e.g., component type), component identifier, semantic identifier, and intrinsic submodel variants (for each intrinsic submodel), covariances (e.g., parameter covariance values, covariance size, etc.), and configurable variables for each represented component, and can optionally include determining initial parameter values for each component parameter, and/or determining any other suitable component data for the component representation 120 (e.g., example shown in FIG. 11B).

In a first variant, the component representation 120 is manually determined. In a first example, a user can programmatically define the component data for a set of component representations 120 for a given system (e.g., example shown in FIG. 11A, FIG. 11B, and FIG. 11E). In a second example, a user can graphically specify the set of component representations 120. In an illustrative example, the user can select graphical representations (e.g., icons) of the component representations 120 of the system, and specify the component data for each component representation 120 (e.g., via a set of fields, dropdowns, etc.). The graphical representation can be in 2D, 3D, and/or any other suitable set of dimensions.

In a second variant, the component representations 120 are automatically determined. In a first example, a component representation 120 is generated for each component from a system bill of materials. In a second example, a different component representation 120 can be automatically generated when a new component is detected by a component registration system (e.g., local processing system, etc.). The component data for each component representation 120 can be: determined from the component itself (e.g., component identifier, etc.), determined using default values (e.g., known element type for the component's make and model, semantic names associated with the component's make and model, default intrinsic submodel variant identifiers, etc.), determined based on the observation stream 22 received from the component (e.g., based on the observation type, based on the stream's component identifier, etc.), and/or otherwise determined.

However, the component representations 120 can be otherwise determined.

Determining the constraint representations 140 function to define representations for each constraint within the represented system. Determining the constraint representations 140 can include determining the constraint type and determining the component representations 120 associated with (e.g., connected to) the constraint representation 140, and can optionally include determining the constraint parameter values (e.g., extrinsic parameter values, covariances, synchronization, resolution, etc.), determining a semantic identifier for the constraint, and/or determining any other suitable constraint data for the constraint representation 140 (e.g., examples shown in FIG. 11C, FIG. 11D, and FIG. 11E).

In a first variant, constraint representations 140 can be manually specified. In a first embodiment, a user programmatically specifies the constraint representations 140 (e.g., examples shown in FIG. 11C, FIG. 11D, and FIG. 11E). In a second embodiment, a user graphically specifies the constraint representations 140 by defining connections between different component representations 120 (e.g., using concurrent node selections, using a click-and-drag action to connect nodes, using a dropdown menu, etc.), wherein the constraint type can be selected by the user and the associated component representations 120 can be defined by the endpoints of the connection. When the constraint type requires directionality, the direction can be: be assigned using a set of rules (e.g., based on which constraints have been optimized and which have not, based on a graph constraint, etc.), be set by the user, randomly assigned, specified by the order of component representation selection, and/or otherwise determined.

In a second variant, the constraint representations 140 can be automatically specified.

In a first embodiment, the constraint representations 140 can be randomly generated between component representation 120 pairs. In a first example, a constraint representation 140 can be defined between every component representation 120 combination. In a second example, constraint representations 140 are defined such that all component representations 120 are at least indirectly connected (e.g., unconnected component representations 120 are randomly connected until the set of component representations 120 forms a fully connected graph). However, constraint representations 140 can be generated to satisfy any other suitable connection condition.

In a second embodiment, the constraint representations 140 can be generated according to a set of rules. In a first example, constraint representations 140 can be defined between automatically-created component representations 120 in the order of component representation 120 creation (e.g., in order of registration in a precedence-dependent chain). In a second example, constraint representations 140 can be defined according to a set of rules (e.g., all components within a device are spatially connected to each other; unconnected clusters of component representations 120 within the same system representation 100 must be connected by a spatial and/or temporal constraint representation; a spatial and/or temporal constraint representation can be defined between components that are connected by a semantic constraint but not otherwise connected, etc.). In a third example, constraint representations 140 without constraint data (e.g., no extrinsic values, no synchronization values, etc.) can be removed post-calibration. In a fourth example, redundant constraint representations 140 (e.g., redundantly connecting component representations 120) can be removed. In this example, redundant constraint representations 140 can be removed at random, the redundant constraint representation 140 with the largest overall covariance can be removed (e.g., wherein the overall covariance is aggregated along the series of constraint representations 140 cooperatively connecting two component representations 120), and/or any other redundant constraint representation 140 can be removed.

However, the component representations 120 can be otherwise manually determined.

However, the system representations 100 can be otherwise defined.

The determined system representation 100 can preferably be stored (e.g., remotely, locally, etc.). Alternatively, the model cannot be stored.

Determining the observation streams from the system S200 functions to obtain observations for calibration and/or analysis. Determining the observation streams additionally and/or alternatively function to identify the observation types and the associated component identifiers that the platform will encounter. S200 is preferably continuously performed, but can alternatively be performed once or at any other suitable time. The observation streams 22 are preferably generated by the components of the system, but can be otherwise generated. The observation streams are preferably generated during system operation, but can be generated at any other time. System operation can be physical operation (e.g., in the real world), simulated operation, and/or other operation. Each observation and/or observation stream can be associated with: a component identifier, an element type (e.g., component type, observation type, etc.), a timestamp, and/or any other suitable metadata. The metadata values are preferably assigned by the component or device generating the observation, but can alternatively be assigned by the processing system receiving the observation stream (e.g., the platform, the system processor, etc.), and/or otherwise determined.

Figure 9:
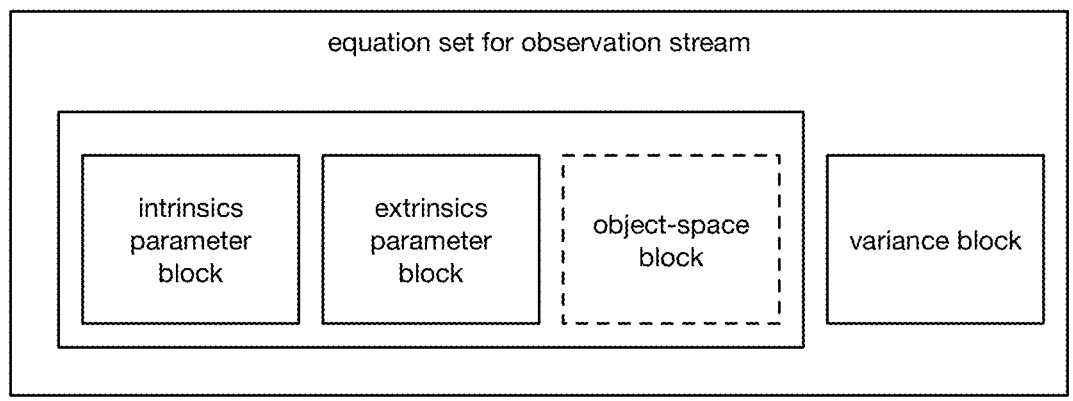
FIG. 9 is a schematic representation of an example equation set for an observation stream.

Determining a calibration equation set for the system S300 functions to compose a set of calibration equations for optimization. The calibration equation set is preferably determined based on the observation streams from S200, but can alternatively be determined based on the component identifiers for the system or otherwise determined. The calibration equation set preferably includes a different equation set for each observation stream instance, but can alternatively share an equation set across different observation stream instances (e.g., of the same observation type), or be otherwise constructed. Each equation set for each observation stream instance can include: an intrinsic block, an extrinsic block, an object-space block, a variance block for the observations within the observation stream (e.g., example shown in FIG. 9), and/or any other suitable block of parameters.

In a first variation, determining the calibration equation set can include: determining the set of model identifiers (e.g., intrinsic model identifiers, intrinsic submodel variant identifiers, etc.) specified by each component representation 120; aggregating the model equations identified by the model identifiers into the calibration equation set; and aggregating the constraint equations associated with each constraint representation 140 into the calibration equation set. Parameter values (e.g., intrinsic parameter values, extrinsic parameter values, synchronization parameter values, etc.), uncertainty values, configurable variable values, and/or other values can optionally be populated into the calibration equation set from the respective component representations 120 and constraint representations 140. Object space models (e.g., associated with or defined by each component representation 120; global object space models; etc.) can optionally also be aggregated into the calibration equation set. Additionally or alternatively, the calibration equation set can be determined relative to an object space, or be determined independent of an object space (e.g., global reference). In this variation, specific variable instances that are shared between different models or equations (e.g., that represent the same component, that represent the same component parameter, etc.) can be automatically determined (e.g., based on the constraint representations 140, based on a set of rules, etc.) and implemented within the calibration equation set (e.g., such that two equations can include the same variable instance).

Figure 3:
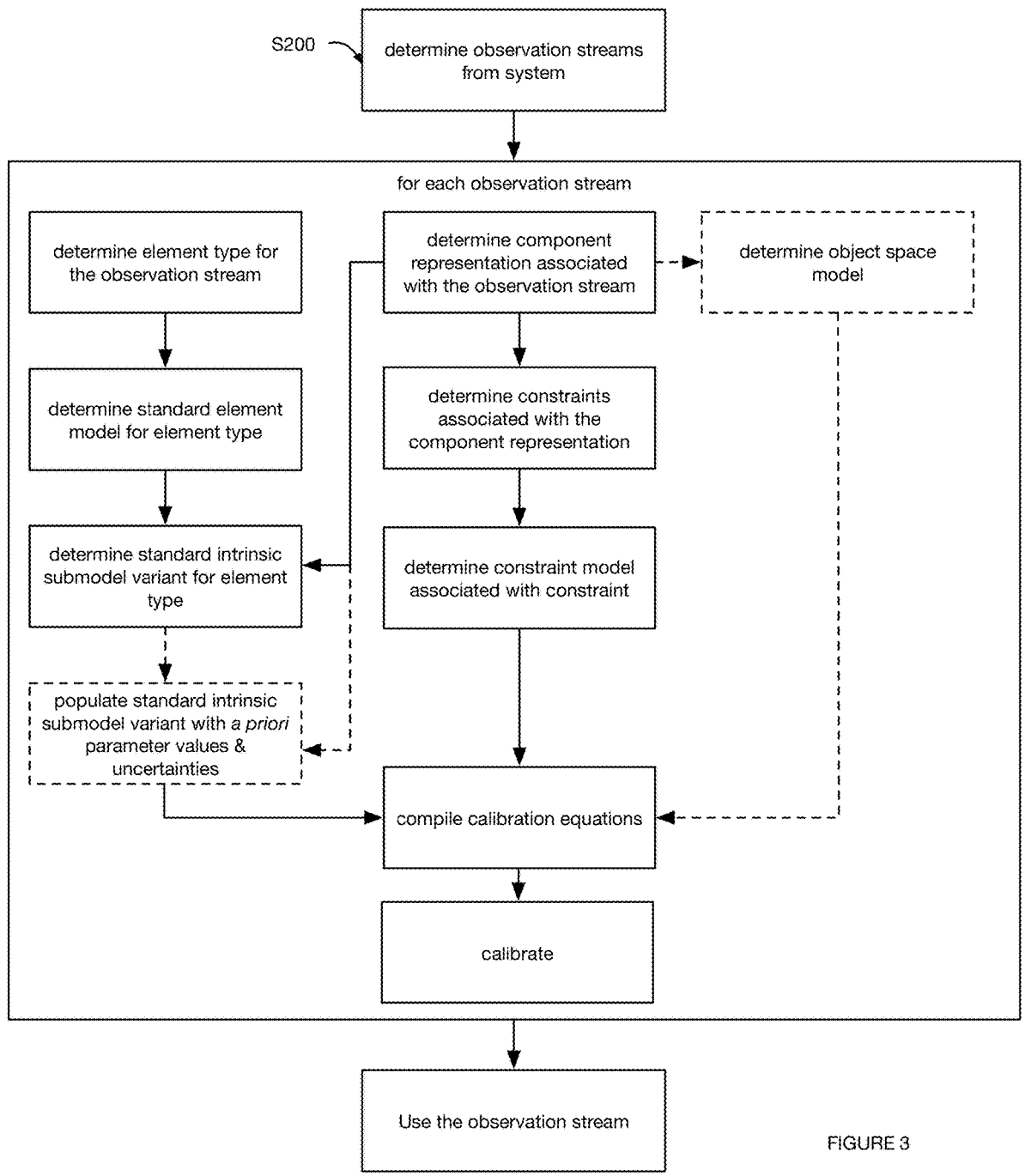
FIG. 3 is a schematic representation of an example of calibrating a system.
Figure 4:
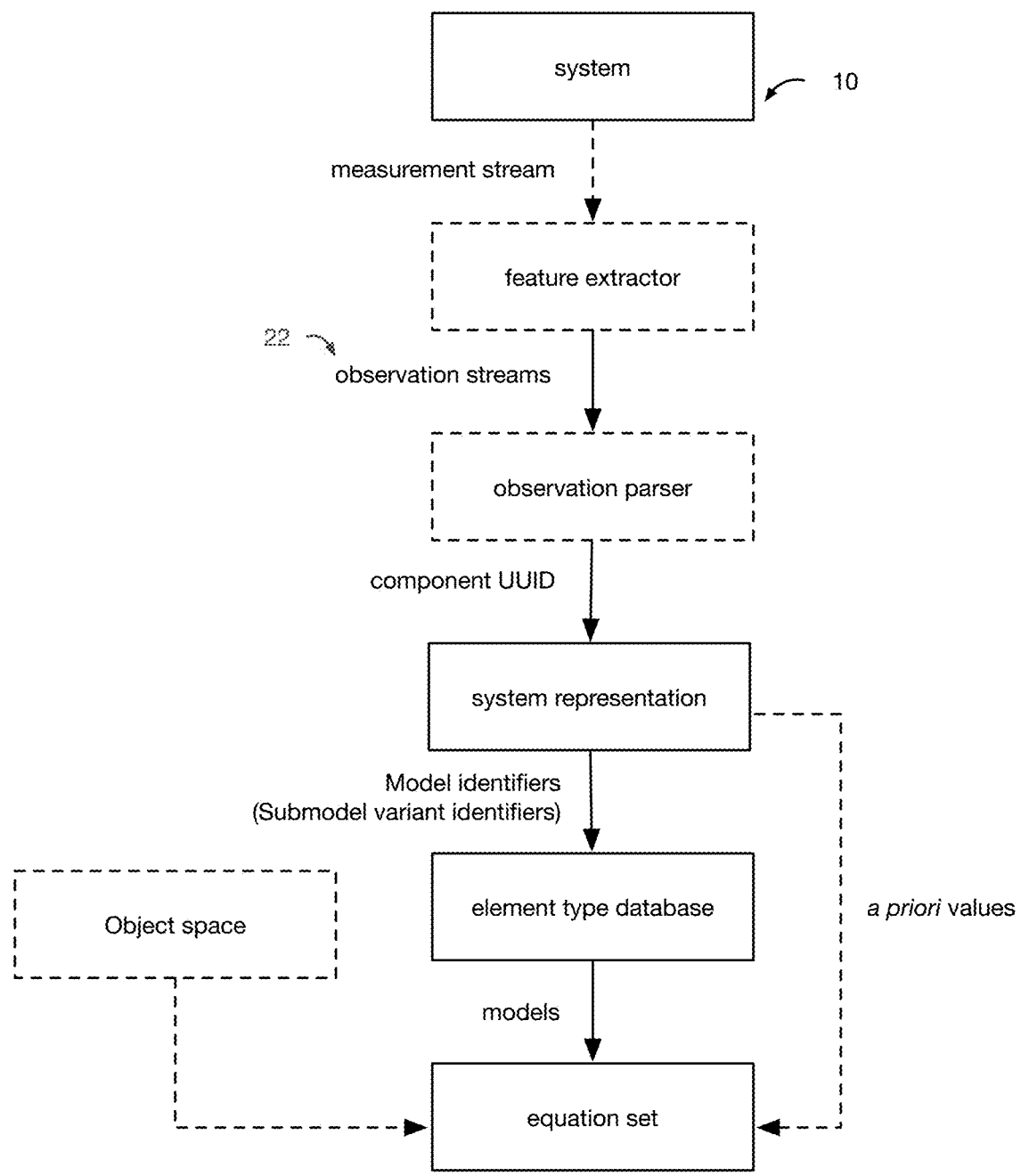
FIG. 4 is a schematic representation of a variant of calibration equation set composition.

In a second variation, determining the calibration equation set can include: for each observation stream: determining the component identifier associated with the observation stream (e.g., from the metadata of the observation stream); determining the element type for the observation stream (e.g., from the metadata of the observation stream); determining the component data associated with the component identifier (e.g., determining the component representation 120 associated with the component identifier and determining the component data for the element type from the component representation 120, etc.); determining the transformation types specified by the component data (e.g., determining the intrinsic model identifiers specified by the component representation 120); determining the standard model variant associated with the element type and the transformation types; populating the calibration equation set with the standard model (e.g., the standard observation equations, the intrinsic model equations, etc.); populating the calibration equation set with standard extrinsic models based on the constraint representations 140 (e.g., connections, edges, etc.) between component representations 120; optionally populating the calibration equation set with standard object space models (e.g., based on the component representations), and optionally populating the standard model variant with a priori parameters and uncertainty values from the component data, and/or predetermined values (e.g., based on assumptions, such as initial covariance). Determining the standard model variant includes: determining the standard model associated with the element type and populating the submodel of the standard model with the parameters and/or equations for the specified transformation type. The standard model variant can be predetermined and selected based on the element type (e.g., and/or element type-transformation type combination) or be dynamically generated (e.g., in real time, as the observations are received or the calibration process is executing). Examples are shown in FIG. 3 and FIG. 4; illustrative examples are shown in FIGS. 7A-7C and FIGS. 8A-8B.

The calibration equation set can then be generated by compiling the standard model variants determined for each observation stream.

In a second variant, determining the calibration set can include: determining an element model for each component and compiling the element models together to form the calibration equation set. The element model can be determined based on the element type (e.g., wherein each element type can be associated with a predetermined element model), based on the observation type associated with the component (e.g., wherein the observation type is associated with a predetermined model), and/or otherwise determined.

However, the calibration equation set can be otherwise constructed.

Determining calibrated parameter values using the calibration equation set and observation values from each observation stream S400 functions to calibrate the system representation 100. For example, S400 can determine parameter values (e.g., intrinsic parameter values for each component, extrinsic or synchronization parameter values for each constraint, etc.), and determine posterior covariance values for each component and/or constraint. In variants, this can include: associating observation values with the respective calibration equations of the calibration equation set and optimizing the resultant equations.

Figure 7D:
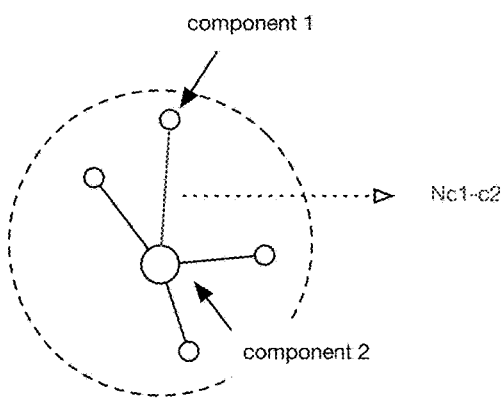
FIG. 7D is an illustrative example of generating a virtual observation from a spatial relationship between two component nodes.

Each equation set is preferably associated with (e.g., share the same row space as) the observation values extracted from the observation stream associated with the respective component (e.g., from one or more timestamps or sampling epochs). The equation set can be associated with the component (generating the observation stream) via the component representation 120 used to set up the equation set, or be otherwise associated with the component and/or observation stream. Additionally or alternatively, the equation set can be associated with virtual observations (e.g., spatial relationships between components) or other observations. For example, each spatial relationship between components (e.g., each edge in the spatial calibration graph) can be converted into a virtual observation (example shown in FIG. 7D), which can include values for the extrinsic parameters, no intrinsic parameters, and no object-space parameters.

Object-space values can optionally be bound to the respective object-space parameters (e.g., used as ground truth for the calibration). The object-space values can be externally captured, automatically determined, retrieved from a database, and/or otherwise determined. The object-space values can be manually determined (e.g., by a user), extracted from CAD, inferred, or otherwise determined. The object-space values for all observations are preferably in (or converted to) a singular coordinate frame (e.g., Cartesian, spherical, etc.), but can alternatively be in different coordinate frames. The uncertainty of the object space values (e.g., determined based on the measurement method, otherwise determined) can optionally be bound to the respective object-space parameter uncertainties, or be set to default values.

Figure 7E:
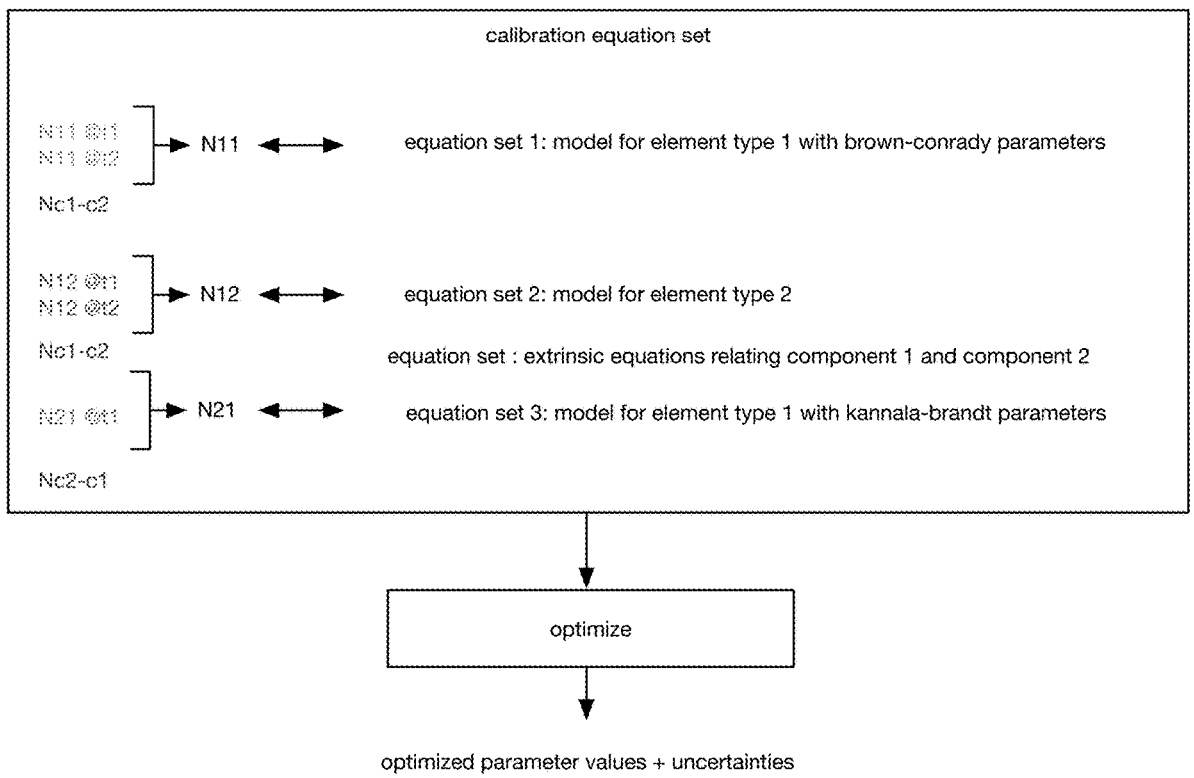
FIG. 7E is an illustrative example of optimizing the equation sets generated in FIGS. 7A-7C, using the observation values from 7A-7D.

Optimizing the resultant equations functions to determine new or updated parameter values and/or uncertainties (e.g., variance-covariance matrices), example shown in FIG. 7E. This can include: optionally selecting the optimization method; and optimizing the equations using the optimization method.

The optimization method is preferably a nonconvex optimization method, but can alternatively be a convex optimization method. Optimization methods that can be selected include: Kalman filters, bundle adjustments, particle filters, recursive least-squares filter, batch techniques, and/or any other suitable optimization method. The optimization method can be selected based on: which constraint types are within the system representation 100 and/or calibration equation set, which element types are within the system representation 100 and/or calibration equation set, by a user, and/or otherwise determined. In variants, selecting the optimization method can include: selecting Bayesian filtering-based method such as Kalman filters (e.g., extended Kalman Filter, unscented Kalman filter, fast Kalman filter, etc.) when all observation types are time-variant, selecting bundle adjustment when all observation types are time invariant, selecting tight or loose coupling based on the estimated uncertainty (e.g., when the observation types include a combination of time variant and invariant observations), and/or otherwise selecting the optimization method. However, the optimization method can be otherwise selected.

The resultant equations can be optimized: as a whole, in blocks (e.g., by submodel), and/or otherwise optimized.

The method can optionally include storing the calibrated parameter values S500, which functions to store the calibrated parameter values and/or the posterior uncertainties (e.g., covariance values) for each component in association with the respective component identifier and store the calibrated parameter values and/or uncertainties for each spatial relationship. This is preferably stored in the system representation 100 (e.g., in the respective component representations 120 and respective constraint representations), but can be otherwise stored. In variants, the calibrated parameter values and/or uncertainties are only stored after the values satisfy a predetermined set of conditions. The conditions can be determined based on the uncertainties (e.g., variances, covariances, etc.), the parameter values, and/or based on any other suitable data. Examples of such conditions can include: individual uncertainties falling below a threshold; total uncertainty for any path in the graph (e.g., cooperatively defined by the system representation) falling below a threshold; parameter correlations satisfying a predetermined expectation; the precision of all estimated parameter values exceeding a threshold precision; and/or any other suitable set of conditions.

The method can additionally or alternatively include using the calibrated system representation S600, which functions to generate calibrated observations. The calibrated observations can be used for accurate and/or precise analysis, comparisons, and/or otherwise used. S600 can optionally determine the uncertainties for an observation, a transformation (e.g., between spatial frames, between temporal frames, etc.), and/or any other suitable observation analysis, wherein the uncertainties can be used for system control and/or otherwise used.

S600 is preferably performed by the system (e.g., by an onboard processing system), but can alternatively be performed by the platform, by a secondary system separate from the represented system, and/or by any other suitable processing system.

In a first variant, S600 includes generating a calibrated observation, which can include: receiving raw observations from the components; determining component representation 120 associated with each observation (e.g., identifying the component representation 120 representing the component generating the observation); and transforming the observation based on the component parameter values (e.g., intrinsic parameter values) from the component representation 120. When the component representation 120 is associated with multiple observation types, the component parameter values (e.g., intrinsic parameter values) associated with the observation type can be used to transform the observation. Observation error can additionally and/or alternatively be calculated based on covariance parameter values from the component representation 120. However, the calibrated observation can be otherwise determined.

In a second variant, S600 includes transforming an observation from a first component to a target reference frame, which can include: determining a set of constraint representations 140 (e.g., path of constraints, path of edges, etc.) relating the first component's component representation 120 to the second component representation 120 representing the target reference frame; and transforming the observation from the first component's reference frame to the target reference frame using the constraint parameter values (e.g., extrinsic parameter values, synchronization parameter values, etc.) associated with the set of constraint representations 140. The observation can optionally be transformed into a calibrated observation using the first component representation's parameter values (e.g., as described in the first variant). Transformation error can optionally be determined based on the covariance parameter values from the set of constraint representations 140 and/or the constraint representations 140 (e.g., using a linear combination of uncertainty; using a non-linear combination of uncertainty; using surrogate models, such as Bayesian probability theory; using other uncertainty propagation methods; etc.). The reference frames can be: a coordinate reference frame, the temporal reference frame, and/or be any other reference frame. The second component representation 120 can represent: a second component, a spatial reference (e.g., a point in space, a reference point), a clock, and/or any other suitable element. In a first example, an observation can be converted into another component's reference frame. In a second example, an observation can be converted into a clock's reference frame. In a third example, an observation can be converted into a reference point's reference frame. However, the calibrated observation can be otherwise determined.

In a third variant, S600 includes generating a synthetic observation from a set of observations received from a set of components, which can include: determining the constraint representations 140 relating the component representations 120 representing each component of the set, determining a synthetic observation generation model associated with the synthetic observation, and transforming the observations into the synthetic observation using the synthetic observation generation model, the constraint parameter values from the constraint representations 140, and optionally the component parameter values from the component representations 120 (e.g., to calibrate the observations). The synthetic observation generation model is preferably different from the models discussed above, but can alternatively be the same. The synthetic observation generation model can be a search strategy, heuristic, machine learning model (e.g., regression, SVM, Bayesian network, neural network, clustering algorithm, etc.), classifier, and/or any other suitable model.

In an illustrative example, the synthetic observation can be a point cloud, generated from two images depicting overlapping views of a common scene, wherein the two images each sampled by a different camera (e.g., different components). The cameras can be represented by camera representations connected by a spatial constraint representation and a temporal constraint representation within the system representation 100. The synthetic observation generation model can be a feature correspondence model configured to output a point cloud based on feature correspondences between the images, and/or any other suitable model. The temporal constraint parameter values can be used to identify which images from each image stream to compare, the component parameter values (e.g., intrinsic parameter values) can be used to correct the images from the respective camera, and the spatial constraint parameter values (e.g., extrinsic parameter values) can be used as the essential matrix within the synthetic observation generation model. Optionally, point cloud error (e.g., for the overall point cloud, for each point, etc.) can be determined using: the intrinsic covariances, the extrinsic covariances, and/or the temporal resolution.

Figure 15:
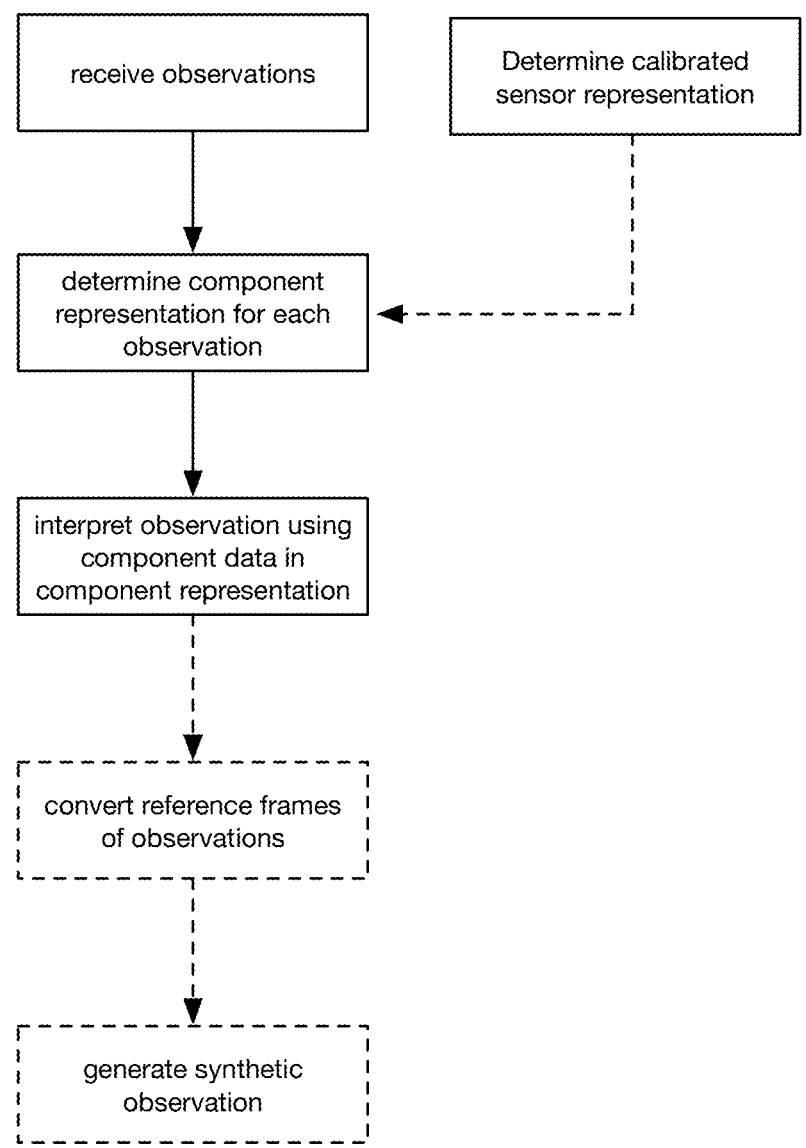
FIG. 15 is a schematic representation of a variant of using the calibrated sensor representation.

In a fourth variant, S600 includes fusing observations from a set of components (e.g., sensor fusion) to generate a fused observation (e.g., a type of synthetic observation), which can include: determining the constraint representations 140 relating the component representations 120 representing each component of the set, determining a sensor fusion model, and fusing the observations using the sensor fusion model, the constraint parameter values and/or uncertainties from the constraint representations 140 (e.g., intrinsic parameter values and intrinsic covariances, respectively), and optionally the component parameter values and/or uncertainties from the component representations 120 (e.g., the extrinsic parameter values and extrinsic covariances, respectively; the synchronization parameter values and uncertainties, respectively; etc.). An example is shown in FIG. 15; an illustrative example is shown in FIG. 13B. The components (e.g., sensors) can be in a redundant (e.g., competitive) configuration, a complimentary configuration, and/or in any other suitable configuration. The components can sample observations in the same or different modality. Examples of sensor fusion models that can be used include: central limit theorem, Kalman filter, Bayesian networks, Dempster-Shafer model, convolutional neural networks (CNNs), Gaussian processes, inverse-variance weighting, a linear combination of the observations weighted by the respective uncertainties (e.g., intrinsic uncertainties, extrinsic uncertainties, synchronization uncertainties, etc.), and/or any other model or algorithm. The fused observation can be used for analysis, control, feature extraction, and/or otherwise used.

Model sets, models, submodels, model variants, and submodel variants described herein can all be models in themselves, be a collection of models, and/or be otherwise defined.

Different processes and/or elements discussed above can be performed and controlled by the same or different entities. In the latter variants, different subsystems can communicate via: APIs (e.g., using API requests and responses, API keys, etc.), requests, and/or other communication channels.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system (e.g., platform) and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the embodiments of the invention without departing from the scope of this invention defined in the following claims.

We claim:
1. A system comprising:
 a non-transitory computer-readable medium storing a data structure representing a set of sensor components related to each other by a set of relationships, the data structure comprising:
  a set of component representations representing the set of sensor components, wherein each component representation is associated with a plurality of intrinsic parameters for a respective sensor component;
  an intrinsic model identifier for each intrinsic parameter of each plurality of intrinsic parameters for each component representation, wherein each intrinsic model identifier identifies an intrinsic parameter model from a set of candidate intrinsic parameter models for a respective intrinsic parameter of the sensor component represented by the respective component representation; and
  a set of constraints relating component representations within the set of component representations to each other, wherein each constraint represents a relationship from the set of relationships; and
 a processing system, comprising a processor, that calibrates the set of sensor components by:
  extracting each intrinsic model identifier and the set of constraints from the data structure;
  for each extracted intrinsic model identifier, retrieving an intrinsic parameter model identified by the respective intrinsic model identifier, from the set of candidate intrinsic parameter models for the intrinsic parameter;
  constructing an optimization equation set based on the retrieved intrinsic parameter models and the set of constraints; and
  calibrating the set of sensor components using the optimization equation set.

2. The system of claim 1, wherein a sensor component from the set of sensor components comprises at least one of: a camera, radar, LiDAR, a gyroscope, an encoder, a clock, a magnetometer, or an accelerometer.

3. The system of claim 1, wherein each component representation further comprises a set of intrinsic covariances.

4. The system of claim 1, wherein each component representation is associated with an observation type, wherein the set of model identifiers is specific to the observation type.

5. The system of claim 4, wherein the observation type comprises an image, and the set of model identifiers identify: a projection model, a distortion model, and an affinity model.

6. The system of claim 4, wherein the observation type comprises a point cloud, the set of model identifiers identify: a range model, an azimuth model, and an altitude model.

7. The system of claim 1, wherein a constraint comprises at least one of: a spatial constraint, associated with extrinsic parameters and covariances; a temporal constraint, associated with synchronization and resolution; or a semantic relationship.

8. The system of claim 1, wherein the set of component representations and the set of constraints cooperatively define a fully connected graph.

9. The system of claim 1, wherein the optimization equation set comprises a single calibration equation set, and wherein parameter values for the set of component representations and the set of constraints are determined using the single calibration equation set.

10. The system of claim 9, wherein the single calibration equation set comprises equations from the set of retrieved intrinsic parameter models and equations from a set of models associated with the set of constraints.

11. The system of claim 1, wherein a component representation of the set represents a point fixed in at least one spatiotemporal dimension.

12. The system of claim 1, wherein the set of constraints are used to fuse observations from a subset of the set of sensor components, comprising:
- determining the component representations representing each sensor component of the subset;
- determining the set of constraints connecting the component representations; and
- fusing the observations based on constraint parameter values associated with the set of constraints, wherein the constraint parameter values comprise at least one of extrinsic parameter values or temporal parameter values.

13. The system of claim 12, wherein each of the constraints further comprise a constraint uncertainty, wherein an error of the fused observations is determined based on the constraint uncertainties from each of the constraints.

14. The system of claim 1, wherein the set of sensor components are mounted to a system, wherein the data structure is used by the system to interpret observations generated by the set of sensor components.

15. A system, comprising:
- a data structure comprising:
  - a set of component representations representing a set of sensor components, wherein the set of sensor components are related to each other by a set of relationships;
  - a set of model identifiers for the set of component representations, wherein each model identifier identifies an intrinsic parameter model from a set of candidate intrinsic parameter models for an intrinsic parameter of a respective sensor component represented by a respective component representation; and
  - a set of constraints relating the set of component representations, wherein each constraint represents a relationship from the set of relationships; and
- a processing system, comprising a processor, that reads data stored in said data structure, and calibrates the set of sensor components using the data structure by:
- extracting a set of intrinsic parameter models identified by the set of model identifiers;
- composing a calibration equation set from the set of intrinsic parameter models and the set of constraints; and
- calibrating the set of sensor components by calculating a set of intrinsic parameters of the set of sensor components using the calibration equation set.

16. The system of claim 1, wherein each candidate intrinsic parameter model comprises a different set of equations for the respective intrinsic parameter.

* * * * *